United States Patent
Chiranthan et al.

(10) Patent No.: US 12,025,315 B2
(45) Date of Patent: Jul. 2, 2024

(54) ANNULAR DOME ASSEMBLY FOR A COMBUSTOR

(71) Applicant: General Electric Company, Schenectady, NY (US)

(72) Inventors: Ranganatha Narasimha Chiranthan, Bengaluru (IN); Karthikeyan Sampath, Bengaluru (IN); Perumallu Vukanti, Bengaluru (IN); Pradeep Naik, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/811,762

(22) Filed: Jul. 11, 2022

(65) Prior Publication Data

US 2023/0313996 A1 Oct. 5, 2023

(30) Foreign Application Priority Data

Mar. 31, 2022 (IN) .............................. 202211019498

(51) Int. Cl.
*F23R 3/42* (2006.01)
*F02C 3/14* (2006.01)
(Continued)

(52) U.S. Cl.
CPC .................. *F23R 3/42* (2013.01); *F02C 3/14* (2013.01); *F02C 7/00* (2013.01); *F23R 3/002* (2013.01);
(Continued)

(58) Field of Classification Search
CPC .. F23R 3/002; F23R 3/42; F23R 2900/03041; F23R 2900/00017; F23R 3/60
See application file for complete search history.

(56) References Cited

U.S. PATENT DOCUMENTS 2,669,839 A 2/1954 Saboe
4,322,945 A * 4/1982 Peterson ................. F23R 3/283
60/800

(Continued)

FOREIGN PATENT DOCUMENTS

EP 3453968 B1 10/2021

OTHER PUBLICATIONS

Final Report on Incident to M/S/ Indigo Airlines Airbus A320 Aircraft VT-ITF at Mumbai on Jan. 21, 2017, Jan. 3, 2019, 39 pages.

*Primary Examiner* — Alain Chau
(74) *Attorney, Agent, or Firm* — Venable LLP; Peter T. Hrubiec; Michele V. Frank

(57) ABSTRACT

An annular dome assembly for a combustor. The annular dome assembly includes an annular dome including one or more dome panels defining the annular dome. A first dome panel includes a dome upstream surface and a dome downstream surface opposite the dome upstream surface. One or more dome arms extend from the dome upstream surface. One or more apertures extend from the dome upstream surface to the dome downstream surface. The annular dome assembly also includes a deflector assembly including one or more deflector panels defining the deflector assembly. A first deflector panel includes a deflector upstream surface and a deflector downstream surface opposite the deflector upstream surface. One or more deflector arms extend from the deflector upstream surface. Each of the one or more deflector arms are mounted within a respective aperture of the annular dome.

20 Claims, 7 Drawing Sheets

(51) Int. Cl.
*F02C 7/00* (2006.01)
*F23R 3/00* (2006.01)

(52) U.S. Cl.
CPC ............. *F23R 2900/00017* (2013.01); *F23R 2900/03041* (2013.01)

(56) References Cited

U.S. PATENT DOCUMENTS

| | | | | |
|---|---|---|---|---|
| 4,567,730 A * | 2/1986 | Scott | | F23R 3/002 60/753 |
| 5,271,219 A * | 12/1993 | Richardson | | F23R 3/10 60/804 |
| 5,285,632 A * | 2/1994 | Halila | | F23R 3/10 60/753 |
| 5,291,732 A * | 3/1994 | Halila | | F23R 3/002 60/753 |
| 5,419,115 A * | 5/1995 | Butler | | F23R 3/283 60/740 |
| 6,148,600 A | 11/2000 | Farmer et al. | | |
| 6,751,961 B2 * | 6/2004 | Pacheco-Tougas | | F23R 3/002 60/754 |
| 6,978,618 B2 * | 12/2005 | Pacheco-Tougas | | F23R 3/002 60/754 |
| 6,986,201 B2 | 1/2006 | Moertle et al. | | |
| 7,152,411 B2 | 12/2006 | McCaffrey et al. | | |
| 7,845,174 B2 * | 12/2010 | Parkman | | F23R 3/60 60/800 |
| 9,377,198 B2 * | 6/2016 | Eastwood | | F23R 3/10 |
| 9,696,037 B2 | 7/2017 | Kidder et al. | | |
| 9,746,184 B2 | 8/2017 | Papple et al. | | |
| 9,976,746 B2 * | 5/2018 | Bloom | | F23R 3/002 |
| 10,012,390 B2 * | 7/2018 | Bake | | F23M 5/02 |
| 10,041,676 B2 * | 8/2018 | Patel | | F23R 3/60 |
| 10,371,382 B2 * | 8/2019 | Corsmeier | | F23R 3/002 |
| 10,458,652 B2 | 10/2019 | Graves et al. | | |
| 10,533,746 B2 | 1/2020 | Rimmer et al. | | |
| 10,808,930 B2 | 10/2020 | Schlichting | | |
| 10,816,213 B2 * | 10/2020 | Jones | | F23R 3/14 |
| 10,823,419 B2 * | 11/2020 | Jones | | F23R 3/60 |
| 11,346,555 B2 * | 5/2022 | Freeman | | F23R 3/50 |
| 2016/0010869 A1 * | 1/2016 | Bake | | F23R 3/60 60/798 |
| 2016/0186999 A1 * | 6/2016 | Freeman | | F23R 3/007 29/889.22 |
| 2017/0009986 A1 * | 1/2017 | Patel | | F23R 3/002 |
| 2017/0059167 A1 * | 3/2017 | Bloom | | F23R 3/007 |
| 2018/0094813 A1 * | 4/2018 | Corsmeier | | F23R 3/007 |
| 2019/0093893 A1 * | 3/2019 | Clemen | | F23R 3/286 |
| 2019/0271469 A1 * | 9/2019 | Jones | | F23R 3/50 |
| 2019/0271471 A1 * | 9/2019 | Jones | | F23R 3/14 |
| 2021/0102702 A1 * | 4/2021 | Freeman | | F23R 3/002 |
| 2021/0325043 A1 * | 10/2021 | Freeman | | F23R 3/46 |
| 2021/0348761 A1 | 11/2021 | Clum et al. | | |

* cited by examiner

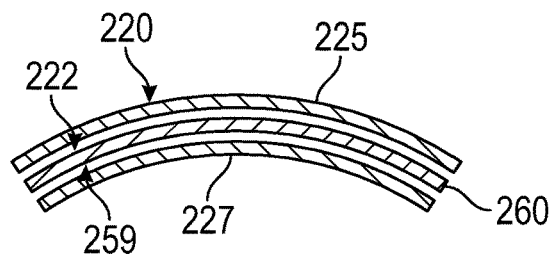
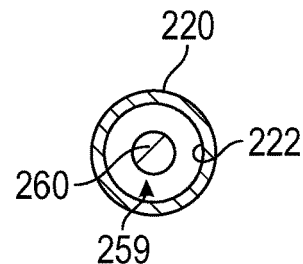
FIG. 3A
FIG. 3B
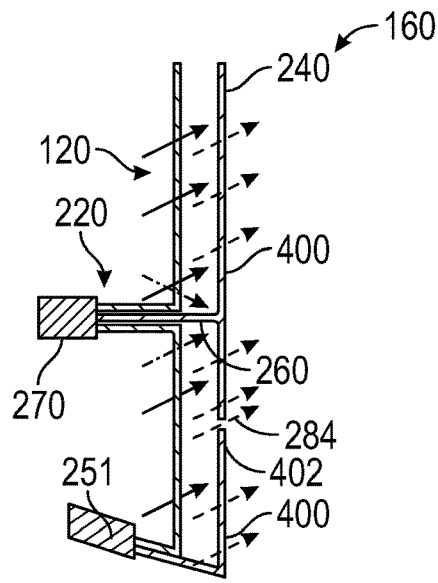
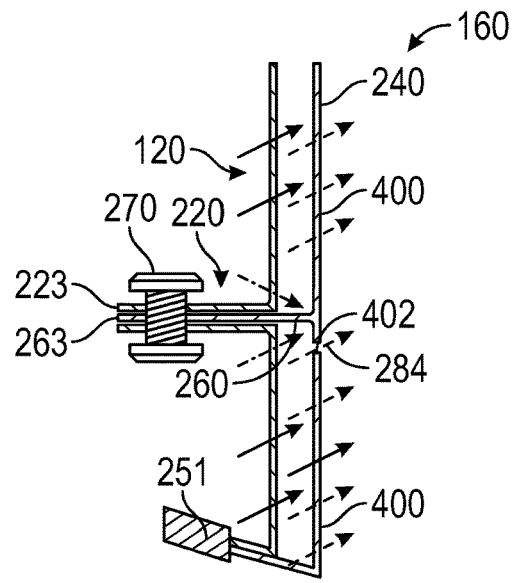
FIG. 4A
FIG. 4B
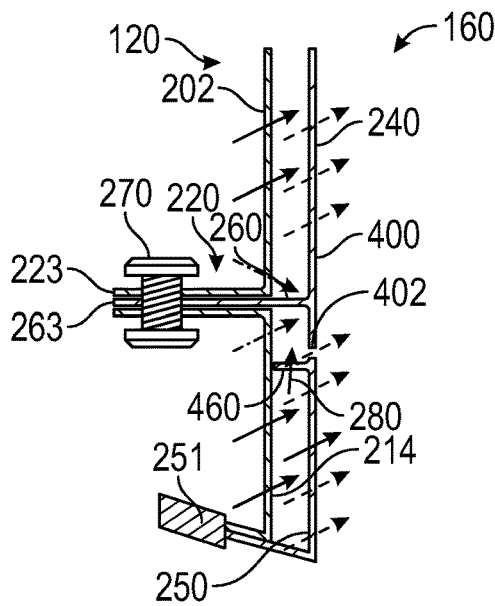
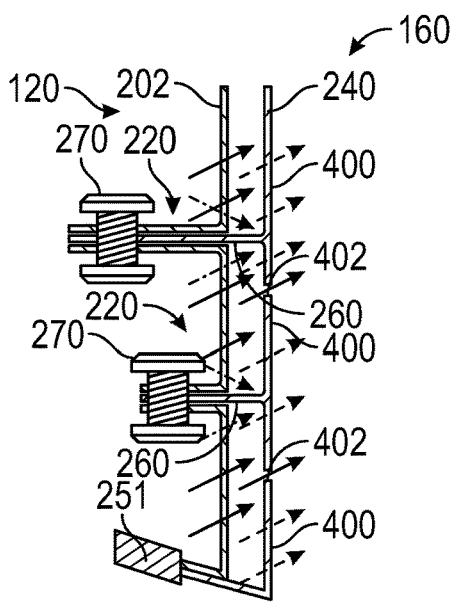
FIG. 4C
FIG. 4D

__

ANNULAR DOME ASSEMBLY FOR A COMBUSTOR

CROSS REFERENCE TO RELATED APPLICATIONS

The present application claims the benefit of Indian Patent Application No. 202211019498, filed on Mar. 31, 2022, which is hereby incorporated by reference herein in its entirety.

TECHNICAL FIELD

The present disclosure relates to an annular dome assembly for a combustor of a gas turbine engine, and, more particularly, to an improved mounting arrangement for an annular dome assembly.

BACKGROUND

A gas turbine engine may include a combustion section having a combustor that generates hot combustion gases discharged into a turbine section of the engine. The combustion section may include an annular dome assembly including an annular dome and a deflector assembly to shield portions of the combustion section from the hot combustion gases. The deflector assembly may be mounted to the annular dome.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 3A is a cross-sectional front view, taken at line 3-3 in FIG. 2A, of a first example of an arm of the annular dome assembly, according to an aspect of the present disclosure.

FIG. 3B is a cross-sectional front view of a second example of an arm of the annular dome assembly, according to an aspect of the present disclosure.

FIG. 4A is a schematic partial cross-sectional view of another annular dome assembly, according to aspects of the present disclosure.

FIG. 4B is a schematic partial cross-sectional view of another annular dome assembly, according to aspects of the present disclosure.

FIG. 4C is a schematic partial cross-sectional view of another annular dome assembly, according to aspects of the present disclosure.

FIG. 4D is a schematic partial cross-sectional view of another annular dome assembly, according to aspects of the present disclosure.

DETAILED DESCRIPTION

Figure 1A:
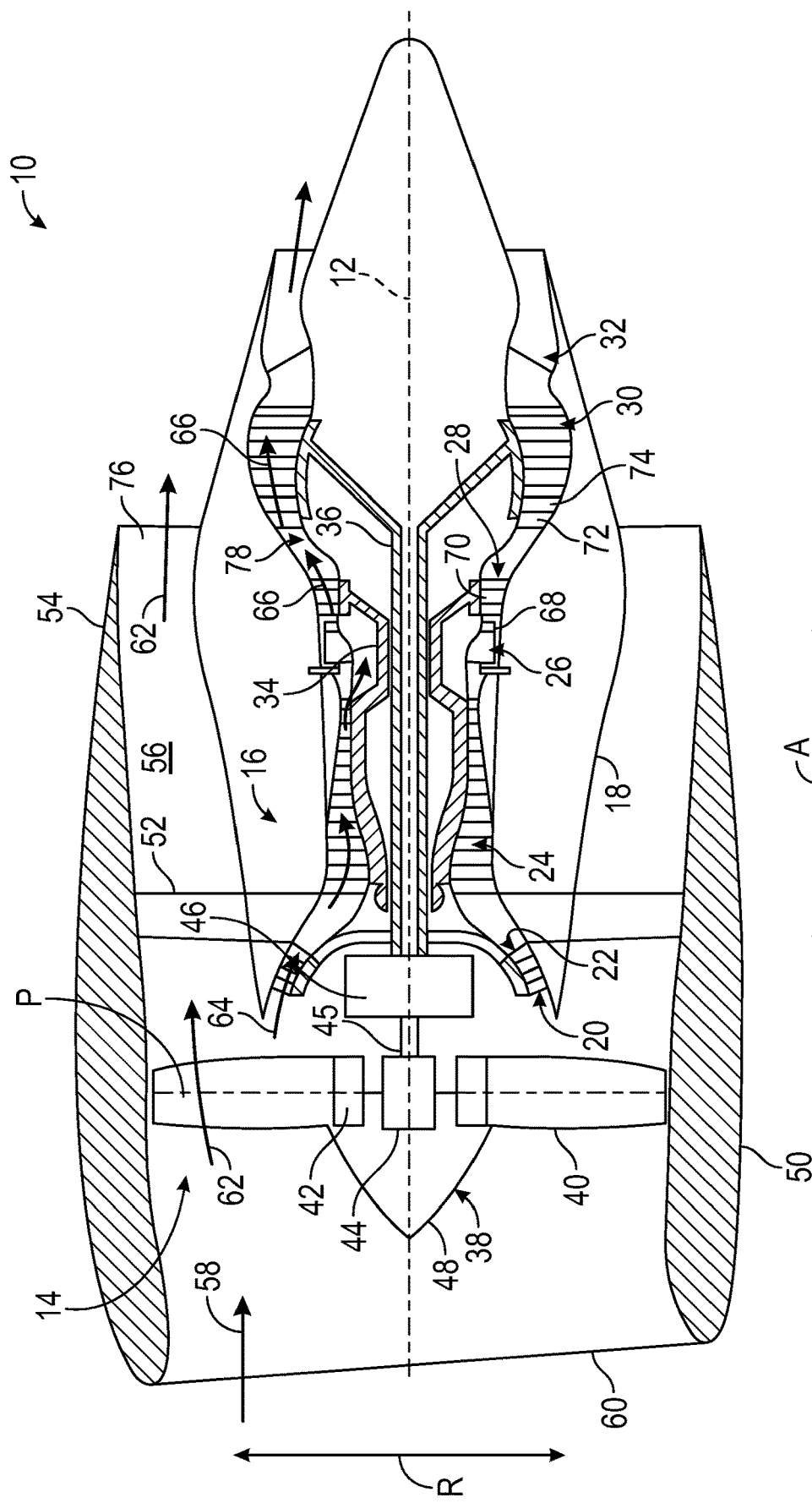
FIG. 1A is a schematic cross-sectional diagram of a turbine engine, taken along a centerline axis of the turbine engine, according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

In combustors without the benefit of the present disclosure, a bolted arrangement of one or more bolts may be used to fasten the deflector assembly to the annular dome. The bolted arrangement typically includes a bolt at each of the corners of panels of the deflector assembly. When the deflector assembly and the annular dome are assembled, a head portion of the bolts may be exposed to hot combustion gases. Accordingly, the bolted arrangement of some deflector assemblies may experience thermal distress around the bolts due to the proximity of the head portions to the hot combustion gases. In some instances, the thermal distress around the bolts may cause failure to a portion of the deflector assembly around a bolt region or damage a portion of the deflector assembly around a bolt region. Thus, embodiments of the present disclosure provide for an improved mounting arrangement of the deflector assembly such that the bolts (or other fastening mechanisms) are disposed entirely on a cold side of the deflector assembly. In this way, the fastening mechanisms (e.g., bolts, brazing, rivets, etc.) may be disposed in a low thermal gradient zone, rather than a high thermal gradient zone. Such an arrangement may help to improve a durability and a life cycle of such deflector assemblies as compared to deflector assemblies without the benefit of the present disclosure.

The deflector assembly of the present disclosure may include extended fins or arms that are extended into a corresponding sectoral slot, or aperture, of the annular dome. For example, the fins or the arms of the deflector assembly may be inserted into the respective sectoral slots, or apertures, of the annular dome. In this way, the deflector assembly may be mounted to the annular dome. The fins or the arms may be bolted, brazed, and/or riveted to secure the fins or the arms to the annular dome. The fins or the arms may be spaced circumferentially around a respective panel. In some instances, air may leak through an area of a bolt. Thus, the fins or the arms may be brazed to respective arms of the annular dome to help to reduce leakage of air or to prevent leakage of air. A gap between the deflector assembly and the annular dome may be controlled using an outer rim of the deflector assembly that may be seated on the annular dome. One or more seals may be used to seal the gap in addition to, or alternatively to, the outer rim.

The deflector assembly may include one or more panels that together define the deflector assembly. Each panel may include a singular, unitary piece. In some examples, each panel may be segmented such that each panel includes a plurality of separate segments. Each segment may include one or more of the fins or one or more of the arms such that each segment may be separately attached to the annular dome and/or separately removed from the annular dome. This may allow for ease of maintenance such that only segments that are worn or are otherwise damaged may be removed and replaced, rather than removing and replacing an entire panel of the deflector assembly.

A portion of cooling air may be directed to a downstream surface (e.g., a hot side) of the deflector assembly through one or more gaps between respective segments of a panel. The one or more gaps between the segments may include various size, shapes, and/or angles to direct the cooling air, as desired. Further, cooling air may also be directed to a corner formed between the fins or the arms and a respective panel to further increase a durability of the panel in an area of the fins or the arms. The corner formed between the fins or the arms and the respective panel may include a blended corner such that the surface of the fins or the arms smoothly blends into the surface of the respective panel. This may help to reduce stress on the corner.

Referring now to the drawings, FIG. 1A is a schematic cross-sectional diagram of a turbine engine 10, taken along a centerline axis of the turbine engine 10, according to an embodiment of the present disclosure. As shown in FIG. 1A, the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1A, the outer casing 18 encases, in serial flow relationship, a compressor section including a booster or a low pressure (LP) compressor 22 followed downstream by a high pressure (HP) compressor 24, a combustion section 26, a turbine section including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section, the combustion section 26, the turbine section, and the jet exhaust nozzle section 32 together define a core air flowpath.

For the embodiment depicted in FIG. 1A, the fan section 14 includes a fan 38 (e.g., a variable pitch fan) having a plurality of fan blades 40 coupled to a disk 42 in a spaced apart manner. As depicted in FIG. 1A, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline 12 via a fan shaft 45 that is powered by the LP shaft 36 across a power gearbox 46, also referred to as a gearbox assembly 46. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1A, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to provide combustion gases 66, as detailed further below.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and the HP turbine rotor blades 70 that are coupled to the HP shaft 34, thus causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of the LP turbine stator vanes 72 that are coupled to the outer casing 18 and the LP turbine rotor blades 74 that are coupled to the LP shaft 36, thus, causing the LP shaft 36 to rotate. This thereby supports operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1A is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 1B:
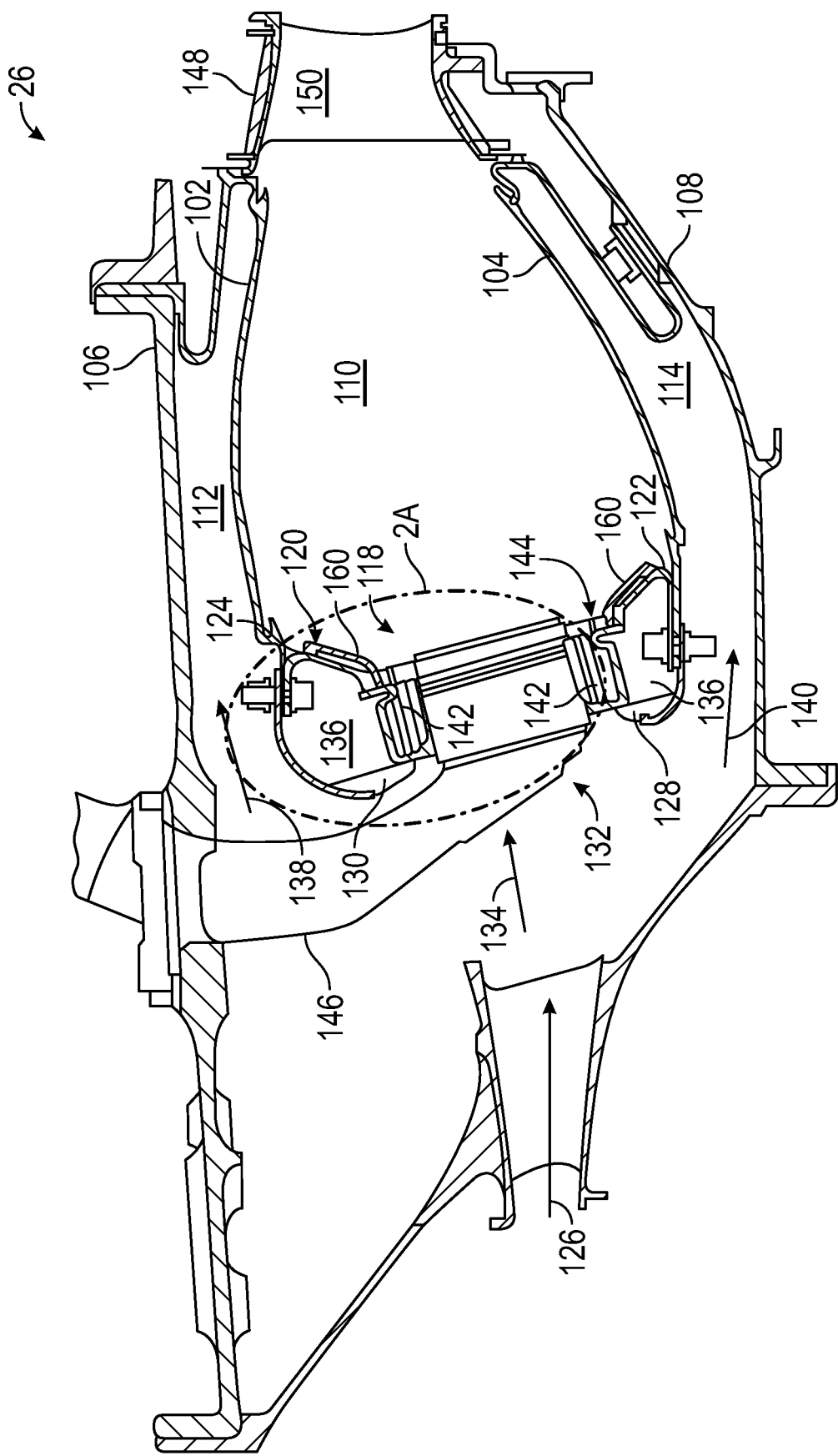
FIG. 1B a schematic partial cross-sectional view of a portion of an exemplary combustion section used in a turbine engine and having an exemplary annular dome assembly, according to an aspect of the present disclosure.

FIG. 1B is a schematic partial cross-sectional view of a portion of an exemplary combustion section 26 having a deflector assembly 160 used in a turbine engine system, as may incorporate various embodiments of the present disclosure. The turbine engine system may be the turbine engine 10 of FIG. 1A. Turbine engine systems may include any suitable configuration, such as, but not limited to, turbofan, turboprop, turboshaft, turbojet, or prop-fan configurations for aviation, marine, or power generation purposes. Still further, other suitable configurations may include steam turbine engines or another Brayton cycle machine. Various embodiments of the combustion section 26 may further define a rich burn combustor in particular. Other embodiments may, however, define a lean burn combustor configuration. In the exemplary embodiment, the combustion section 26 includes an annular combustor. One skilled in the art will appreciate that the combustor may be any other combustor, including, but not limited to, a single annular combustor or a double annular combustor, a can-combustor, or a can-annular combustor.

As shown in FIG. 1B, the combustion section 26 includes an outer liner 102 and an inner liner 104 disposed between an outer combustor casing 106 and an inner combustor casing 108. The outer liner 102 and the inner liner 104 are spaced radially from each other such that a combustion chamber 110 is defined therebetween. The outer liner 102 and the outer combustor casing 106 form an outer passage 112 therebetween, and the inner liner 104 and the inner combustor casing 108 form an inner passage 114 therebetween.

The combustion section 26 may also include a combustor assembly 118 comprising an annular dome assembly 120 mounted upstream of the combustion chamber 110. The combustor assembly 118 is configured to be coupled to the forward ends of the outer liner 102 and the inner liner 104. More particularly, the combustor assembly 118 includes an inner annular dome 122 attached to the forward end of the inner liner 104 and an outer annular dome 124 attached to the forward end of the outer liner 102.

The combustion section 26 may be configured to receive an annular stream of discharge air 126 (e.g., the pressurized air 64 in FIG. 1A) from a discharge outlet of the HP compressor 24 of the turbine engine 10 (FIG. 1A). To assist in directing the compressed air, the annular dome assembly 120 may further comprise an inner cowl 128 and an outer cowl 130 that may be coupled to the upstream ends of the inner liner 104 and the outer liner 102, respectively. In this regard, an annular opening 132 formed between the inner cowl 128 and the outer cowl 130 enables compressed fluid to enter combustion section 26 through a diffuse opening in a direction generally indicated by flow direction 134. The compressed air may enter into a cavity 136 defined at least in part by the annular dome assembly 120. In various embodiments, the cavity 136 is more specifically defined between the inner annular dome 122 and the outer annular dome 124, and the inner cowl 128 and the outer cowl 130. As will be discussed in more detail below, a portion of the compressed air in the cavity 136 may be used for combustion, while another portion may be used for cooling the combustion section 26.

In addition to directing air into the cavity 136 and the combustion chamber 110, the inner cowl 128 and the outer cowl 130 may direct a portion of the compressed air around the outside of the combustion chamber 110 to facilitate cooling the outer liner 102 and the inner liner 104. For example, as shown in FIG. 1B, a portion of the discharge air 126 may flow around the combustion chamber 110, as indicated by outer passage flow direction 138 and inner passage flow direction 140, to provide cooling air to the outer passage 112 and the inner passage 114, respectively.

In certain exemplary embodiments, the inner annular dome 122 may be formed integrally as a single annular component, and, similarly, the outer annular dome 124 may also be formed integrally as a single annular component. In still certain embodiments, the inner annular dome 122 and the outer annular dome 124 may together be formed as a single integral component. In still various embodiments, the annular dome assembly 120, including one or more of the inner annular dome 122, the outer annular dome 124, the outer liner 102, or the inner liner 104, may be formed as a single integral component. In other exemplary embodiments, the inner annular dome 122 and/or the outer annular dome 124 may alternatively be formed by one or more components joined in any suitable manner. For example, with reference to the outer annular dome 124, in certain exemplary embodiments, the outer cowl 130 may be formed separately from the outer annular dome 124 and attached to the forward end of the outer annular dome 124 using, e.g., a welding process, a mechanical fastener, a bonding process or adhesive, or a composite layup process. Additionally, or alternatively, the inner annular dome 122 may have a similar configuration.

The combustor assembly 118 further includes a plurality of mixer assemblies 142 spaced along a circumferential direction between the outer annular dome 124 and the inner annular dome 122. In this regard, the annular dome assembly 120 defines an opening in which a swirler, a cyclone, or a mixer assembly 142 is mounted, attached, or otherwise integrated for introducing the air/fuel mixture into the combustion chamber 110. Notably, compressed air may be directed from the combustion section 26 into or through one or more of the mixer assemblies 142 to support combustion in the upstream end of the combustion chamber 110.

A liquid fuel and/or a gaseous fuel is transported to the combustion section 26 by a fuel distribution system (not shown), where it is introduced at the front end of a burner in a highly atomized spray from a fuel nozzle. In an exemplary embodiment, each mixer assembly 142 may define an opening for receiving a fuel injector 146 (details are omitted for clarity). The fuel injector 146 may inject fuel in a longitudinal direction, as well as in a generally radial direction, where the fuel may be swirled with the incoming compressed air. Thus, each mixer assembly 142 receives compressed air from the annular opening 132 and fuel from a corresponding fuel injector 146. Fuel and pressurized air are swirled and mixed together by the mixer assemblies 142, and the resulting fuel/air mixture is discharged into combustion chamber 110 for combustion thereof.

The combustion section 26 may further comprise an ignition assembly (e.g., one or more igniters extending through the outer liner 102) suitable for igniting the fuel-air mixture. Details of the fuel injectors and the ignition assembly are omitted in FIG. 1B for clarity. Upon ignition, the resulting hot combustion gases may flow in a generally axial direction through the combustion chamber 110 into and through the turbine section of the engine where a portion of thermal and/or kinetic energy from the hot combustion gases is extracted via sequential stages of turbine stator vanes and turbine rotor blades. More specifically, the hot combustion gases may flow into an annular, first stage turbine nozzle 148. As is generally understood, the first stage turbine nozzle 148 may be defined by an annular flow channel that includes a plurality of radially extending, circularly spaced nozzle vanes 150 that turn the gases so that they flow angularly and impinge upon the first stage turbine blades of the HP turbine 28 of the turbine engine 10 (FIG. 1A).

Referring still to FIG. 1B, the plurality of mixer assemblies 142 are placed circumferentially within the annular dome assembly 120. Fuel injectors 146 are disposed in each mixer assembly 142 to provide fuel and to support the combustion process. Each dome has a heat shield, for example, a deflector assembly 160 that thermally insulates the annular dome assembly 120 from the extremely high temperatures generated in the combustion chamber 110 during engine operation (e.g., from the hot combustion gases). The inner annular dome 122, the outer annular dome 124, and the deflector assembly 160 may define a plurality of openings 144 for receiving the mixer assemblies 142. As shown, the plurality of openings 144 are, in one embodiment, circular. In other embodiments, the openings 144 are ovular, elliptical, polygonal, oblong, or other non-circular cross sections. The deflector assembly 160 is mounted on a combustion chamber side (e.g., a downstream side) of the annular dome assembly 120. The deflector assembly 160 may include a plurality of panels, also referred to as deflector panels 240, as detailed further below.

Compressed air (e.g., the discharge air 126) flows into the annular opening 132 where a portion of the discharge air 126 will be used to mix with fuel for combustion and another portion will be used for cooling the deflector assembly 160. Compressed air may flow around the fuel injector 146 and through swirler vanes 145 (shown in FIG. 2A) around the circumference of the mixer assemblies 142, where compressed air is mixed with fuel and directed into the combustion chamber 110. Another portion of the air enters into a cavity 136 defined by the annular dome assembly 120, the inner cowl 128, and the outer cowl 130. The compressed air in the cavity 136 is used, at least in part, to cool the annular dome assembly 120 and the deflector assembly 160, as detailed further below.

Figures 2A, 2B:
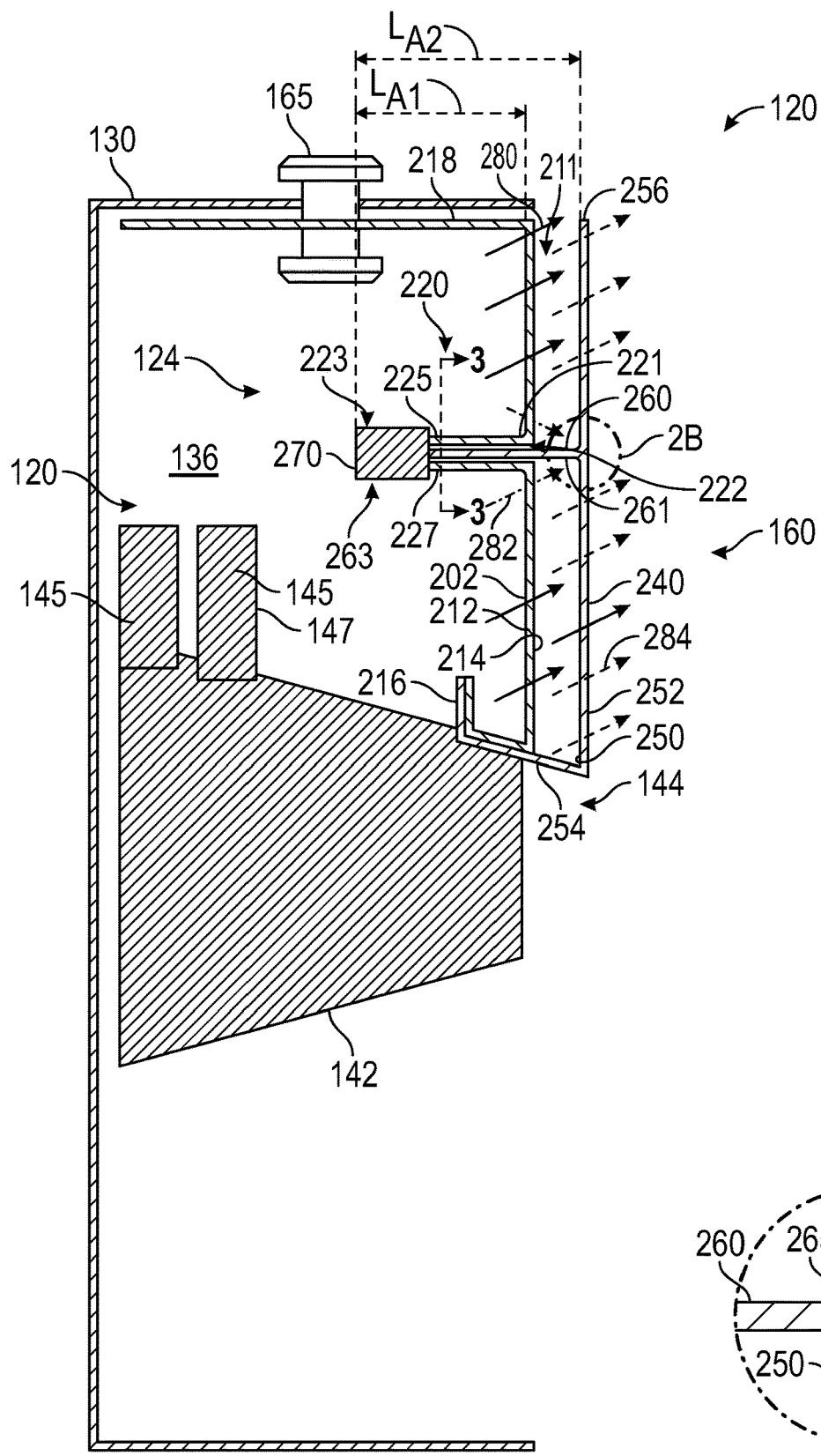
FIG. 2A is a schematic partial cross-sectional view, taken at detail 2A in FIG. 1B, of a portion of an annular dome assembly of the combustion section, according to an aspect of the present disclosure.
FIG. 2B is an enlarged view of a portion of the annular dome assembly as indicated by a detail 2B in FIG. 2A, according to an aspect of the present disclosure.

FIG. 2A is a schematic enlarged cross-sectional view, taken at detail 2A in FIG. 1B, of the annular dome assembly 120 and the deflector assembly 160, according to an aspect of the present disclosure. The annular dome assembly 120 and the deflector assembly 160 extend circumferentially about a central longitudinal axis of the combustion section 26. While the exemplary embodiment described herein depicts the outer annular dome 124 of the annular dome assembly 120, aspects of the present disclosure may, of course, also be utilized in an area of the inner annular dome 122

Figure 5A:
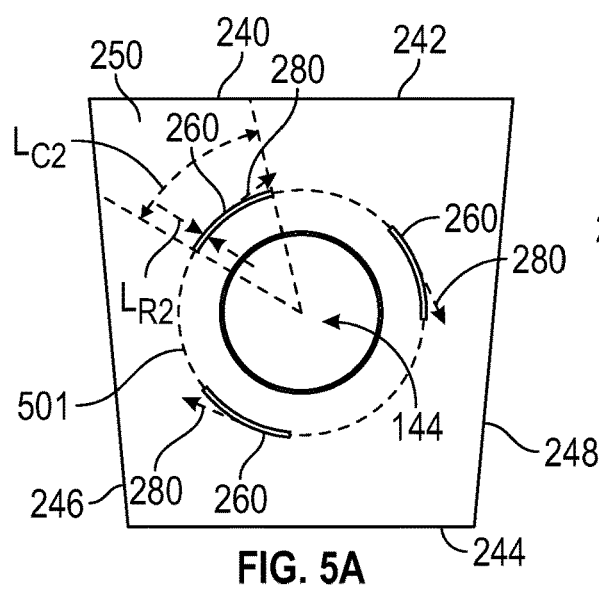
FIG. 5A is a front view of an upstream surface of a portion of a deflector assembly for the annular dome assembly of FIG. 1B, according to aspects of the present disclosure.
Figure 5B:
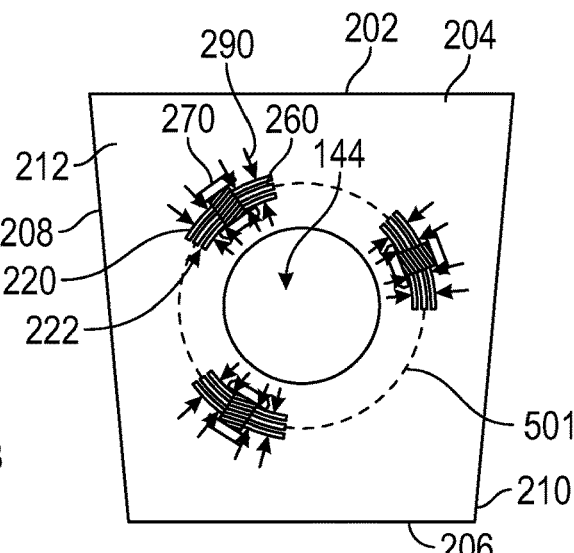
FIG. 5B is a front view of an upstream surface of a portion of the annular dome assembly of FIG. 1B, according to aspects of the present disclosure.

The annular dome assembly 120 may include one or more panels 202, also referred to as dome panels 202 (only one of which is shown in the figures) together to form an integral annular component. In some embodiments, each dome panel 202 may be formed separately and the one or more dome panels 202 may be configured together to form the annular dome assembly 120. In some embodiments, the one or more dome panels 202 may be formed of a singular or unitary structure that defines the annular component of the annular dome assembly 120. With reference to FIGS. 5B, each dome panel 202 includes a circumferential outer side 204 and a circumferential inner side 206. Each dome panel 202 may also include a first radially extending side 208 and a second radially extending side 210 that each extend from the circumferential outer side 204 and the circumferential inner side 206. Each dome panel 202 includes an upstream surface 212, also referred to as a dome upstream surface 212, and a downstream surface 214, also referred to as a dome downstream surface 214 opposite of the dome upstream surface 212.

As shown in FIG. 2A, each dome panel 202 of the annular dome assembly 120 may include a first axially extending wall 216 defining a portion of a respective opening 144 and for receiving a respective mixer assembly 142. The first axially extending wall 216 extends at an angle with respect to a central longitudinal axis of the respective mixer assembly 142. In this way, the first axially extending wall 216 is angled to correspond to an angle of the respective mixer assembly 142 such that the respective mixer assembly 142 can be inserted into the opening 144. Each dome panel 202 may also include a second axially extending wall 218 at a radially outer portion of each dome panel 202. Each dome panel 202 may extend between the first axially extending wall 216 and the second axially extending wall 218. Each dome panel 202 may be attached to the outer cowl 130 (and/or to the inner cowl 128) at the second axially extending wall 218 by one or more fastening mechanisms 165 to fasten the annular dome assembly 120 to the inner cowl 128 and the outer cowl 130. Of course, other means of fastening the annular dome assembly 120 to the inner cowl 128 and the outer cowl 130 may be implemented instead.

Each dome panel 202 of the annular dome assembly 120 may include one or more arms 220, also referred to as dome arms 220, extending between a proximal, first end 221 and a distal, second end 223. The first end 221 may be connected to the dome upstream surface 212 of a respective dome panel 202 such that each dome arm 220 extends from the dome upstream surface 212 to the second end 223. In this way, the one or more dome arms 220 may be disposed in the cavity 136 such that the one or more dome arms 220 are exposed to the cooling air within the cavity 136. The one or more dome arms 220 may be formed integral with a respective dome panel 202. In some examples, the one or more dome arms 220 may be formed separately and attached to a respective dome panel 202, e.g., by brazing, welding, or the like. In the exemplary embodiment, the second end 223 may be a "free end" of a respective dome arm 220 such that the second end 223 is not in contact with another member. Of course, the second end 223 may be in contact with another member such that the second end 223 is not considered a "free end."

Each dome arm 220 may include an axial length $L_{A1}$ (e.g., a length extending in an axial direction) defined from the first end 221 (e.g., at the dome upstream surface 212) to the second end 223. With reference to FIG. 6B, each dome arm 220 may also include a thickness, also called a radial length $L_{R1}$ (e.g., a length extending in a radial direction), and a circumferential length $L_{C1}$ (e.g., a length extending in a circumferential direction). The axial length, the radial length, and the circumferential length of each dome arm 220 may be chosen to minimize thermal stress and mechanical stress on the deflector assembly 160, as detailed further below. Each dome arm 220 may be positioned on a respective dome panel 202 at a respective radial location and a respective circumferential location, as detailed further below.

As shown in FIG. 2A, the one or more dome arms 220 may each define an aperture 222, also referred to as a slot, for receiving a respective arm 260, also referred to as a deflector arm 260, of the deflector assembly 160, as detailed further below. The aperture 222 may extend through the dome downstream surface 214 of a respective dome panel 202. The aperture 222 of each dome arm 220 may include an axial length (e.g., a length extending in an axial direction), a diameter, also called a thickness or a radial height (e.g., a height extending in a radial direction), and a circumferential length (e.g., a length extending in a circumferential direction). The axial length of a respective aperture 222 may generally correspond to the axial length of a respective dome arm 220. The circumferential length of a respective aperture 222 may generally correspond to the circumferential length of a respective dome arm 220. A respective aperture 222 may include a size and/or a shape to receive a respective deflector arm 260 of the deflector assembly 160, as detailed below. The axial length and the circumferential length of a respective aperture 222 may be less than the axial length and the circumferential length of a respective dome arm 220, respectively. Further, the diameter of a respective aperture 222 may include any size for receiving a respective deflector arm 260 of the deflector assembly 160. In some examples, the aperture 222 may be located radially inward or radially outward of the one or more dome arms 220. For example, the aperture 222 may extend only through the dome upstream surface 212 and the dome downstream surface 214 of a respective dome panel 202. In this way, a respective deflector arm 260 of the deflector assembly 160 may be positioned radially outward from a respective dome arm 220 or a respective deflector arm 260 of the deflector assembly 160 may be positioned radially inward from a respective dome arm 220.

Each dome arm 220 may include a first member 225 and a second member 227 that together define a respective dome arm 220. For example, the first member 225 may include a radially outer member of each dome arm 220 and the second member 227 may include a radially inner member of each dome arm 220. Accordingly, the first member 225 may be radially spaced from the second member 227 such that the first member 225 and the second member 227 define the aperture 222. The first member 225 and the second member 227 may extend from the dome upstream surface 212 of each dome panel 202 at approximately the same length to define the length of the respective dome arm 220. The first member 225 and the second member 227 may also extend from the dome upstream surface 212 of each dome panel 202 at different lengths, as desired. The first member 225 and the second member 227 may include separate members such that the first member 225 and the second member 227 are not connected with each other. The first member 225 and the second member 227 may also be connected with each other, for example, at the second end 223 of a respective dome arm 220 such that the first member 225 and the second member 227 form a single, integral component of a respective dome arm 220. While a first member 225 and a second member 227 are described herein, a respective dome arm 220 may include any number of members, as desired. For example, a respective dome arm 220 may include only a single member. In some examples, a respective dome arm 220 may include more than two members. In some examples, the first member 225 may be spaced circumferentially from the second member 227 (as shown in FIG. 7B).

With continued reference to FIG. 2A, the deflector assembly 160 may include one or more panels 240, also referred to as deflector panels 240 (only one of which is shown in the figures) together to form an integral annulus or an annular component. In some embodiments, each deflector panel 240 may be formed separately and the one or more deflector panels 240 may be configured together to form the deflector assembly 160. In some embodiments, the one or more deflector panels 240 may be formed of a unitary structure that defines the annulus or the annular component of the deflector assembly 160. With reference to FIGS. 5A, each deflector panel 240 includes a circumferential outer side 242 and a circumferential inner side 244. Each deflector panel 240 may also include a first radially extending side 246 and a second radially extending side 248 that each extend from the circumferential outer side 242 and the circumferential inner side 244. The circumferential outer side 242, the circumferential inner side 244, the first radially extending side 246, and the second radially extending side 248 may together define an outer circumference of a respective deflector panel 240. Each deflector panel 240 includes an upstream surface 250, also referred to as a deflector upstream surface 250, and a downstream surface 252, also referred to as a deflector downstream surface 252 (shown in FIG. 2A), opposite of the deflector upstream surface 250.

As shown in FIG. 2A, each deflector panel 240 of the deflector assembly 160 may include an axially extending wall 254 defining a portion of a respective opening 144 and for receiving a respective mixer assembly 142. The axially extending wall 254 extends at an angle with respect to a central longitudinal axis of the respective mixer assembly 142. In this way, the axially extending wall 254 is angled to correspond to an angle of the respective mixer assembly 142 such that the respective mixer assembly 142 can be inserted into the opening 144. Each deflector panel 240 may extend between the axially extending wall 254 and a radially outer end 256. Each deflector panel 240 may include a an axially extending member 255 (as shown in FIGS. 10A to 11B) extending axially from the radially outer end 256 to seal a cavity 211 between the deflector assembly 160 and the annular dome assembly 120, as detailed further below. When the deflector assembly 160 is mounted to the annular dome assembly 120, the axially extending wall 254 of the deflector assembly 160 may be extend axially to a generally similar length as the first axially extending wall 216 of the annular dome assembly 120. The axially extending wall 254 and the first axially extending wall 216 may be secured together by one or more fastening mechanisms 251 (shown schematically in FIGS. 4A to 4D). The one or more fastening mechanisms 251 may include any type of fastening mechanism, such as, for example, studs, bolts, screws, nuts, rivets, braising, welding, or the like.

Each deflector panel 240 of the deflector assembly 160 may include one or more deflector arms 260 extending between a proximal, first end 261 and a distal, second end 263. The first end 261 may be connected to the deflector upstream surface 250 of a respective deflector panel 240 such that each deflector arm 260 extends from the deflector upstream surface 250 to the second end 263. The one or more deflector arms 260 may be formed integral with a respective deflector panel 240. In some examples, the one or more deflector arms 260 may be formed separately and attached to a respective deflector panel 240, e.g., by brazing, welding, or the like. As shown in FIG. 2B, the connection between a respective deflector arm 260 and the deflector upstream surface 250 may define a corner 265. The corner 265 may include a curved surface, also referred to as a blended joint or a blended corner, from the respective deflector arm 260 to the deflector upstream surface 250 of a respective deflector panel 240. Such a connection between a respective deflector arm 260 and a respective deflector panel 240 may provide for reduced stress or for minimized stress between the respective deflector arm 260 and the respective deflector panel 240.

The one or more deflector arms 260 may be circumferentially located on the deflector upstream surface 250 of a respective dome panel 240 and may be radially located on the deflector upstream surface 250 of a respective deflector panel 240 such that each deflector arm 260 may align with a respective aperture 222 of the annular dome assembly 120. Accordingly, each deflector arm 260 of the deflector assembly 160 may be inserted into the aperture 222 of a respective dome arm 220 of the annular dome assembly 120. In this way, the deflector assembly 160 may be mounted to the annular dome assembly 120. For example, a respective deflector panel 240 of the deflector assembly 160 may be mounted to a respective dome panel 202 of the annular dome assembly 120.

When the deflector assembly 160 is mounted to the annular dome assembly 120, the one or more deflector arms 260 may be disposed between the first member 225 and the second member 227 of a respective dome arm 220 in the cavity 136. In the exemplary embodiment, the second end 263 may be a "free end" of a respective deflector arm 260 such that the second end 263 is not in contact with another member. Of course, the second end 263 may be in contact with another member such that the second end 263 is not considered a "free end."

Each deflector arm 260 may include an axial length $L_{A2}$ (e.g., a length extending in an axial direction) defined from the first end 261 (e.g., at the deflector upstream surface 250) to the second end 263. With reference to FIG. 5A, each deflector arm 260 may also include a thickness, also called a radial length $L_{R2}$ (e.g., a length extending in a radial direction), and a circumferential length $L_{C2}$ (e.g., a length extending in a circumferential direction). In the exemplary embodiment, the axial length of each deflector arm 260 may include a length such that the second end 263 of a respective deflector arm 260 generally aligns axially with the second end 223 of a respective dome arm 220 when the deflector assembly 160 is mounted to the annular dome assembly 120. The axial length of each deflector arm 260 may also include a length such that each deflector arm 260 extends axially downstream beyond the dome downstream surface 214 of a respective dome panel 202 and the deflector assembly 160 is axially spaced from the annular dome assembly 120 when the deflector assembly 160 is mounted to the annular dome assembly 120. Thus, a cavity 211, or a gap, is formed between the deflector assembly 160 and the annular dome assembly 120.

The axial length of each deflector arm 260 and the axial length of each dome arm 220 may be chosen as a function of a diameter of the fastening mechanisms 270. For example, the axial length of each deflector arm 260 and of each dome arm 220 may include a length of at least two times a diameter of the fastening mechanisms 270. In this way, each deflector arm 260 and each dome arm 220 may be long enough to provide mechanical strength and withstand mechanical stresses around the fastening mechanisms 270. The axial length of each deflector arm 260 and of each dome arm 220 may include a maximum axial length of eight times a diameter of the fastening mechanisms 270. The maximum axial length of each deflector arm 260 and of each dome arm 220 may be chosen such that the respective deflector arm 260 and the respective dome arm 220 do not interfere with airflow into the swirler vanes 145. In this way, the maximum axial length of each deflector arm 260 and of each dome arm 220 may be up to an axial location of a downstream surface 147 of the swirler vanes 145.

The radial length of each deflector arm 260 may generally correspond to the diameter of a respective aperture 222. The radial length of each deflector arm 260 and of each dome arm 220 may be the same thickness of the deflector panel 240 and of the dome panel 202, respectively, at a minimum. The radial length of each deflector arm 260 and of each dome arm 220 may be two times the thickness of the deflector panel 240 and of the dome panel 202, respectively, at a maximum. Such a range of the radial height of each deflector arm 260 and of each dome arm 220 may provide for strength and stiffness of each deflector arm 260 and of each dome arm 220 to withstand mechanical stresses on the respective deflector arm 260 and on the respective dome arm 220. The radial length of each deflector arm 260 and of each dome arm 220 may be chosen as a function of providing strength and stiffness, while minimizing overall weight of the respective deflector panel 240 and of the respective dome panel 202.

The circumferential length of each deflector arm 260 may generally correspond to the circumferential length of a respective aperture 222. Accordingly, a respective deflector arm 260 may be inserted into a respective aperture 222. Further, the radial length of the respective deflector arm 260 may include a length such that a gap 259 (shown in FIGS. 3A and 3B) between an inner surface of a respective dome arm 220 of the annular dome assembly 120 and the outer surface of a respective deflector arm 260 of the deflector assembly 160 may be minimized. In this way, any leakage of air between a respective deflector arm 260 and a respective dome arm 220 may be reduced.

The circumferential length of each deflector arm 260 and of each dome arm 220 be two times a diameter of the fastening mechanisms 270, at a minimum. The circumferential length of each deflector arm 260 and of each dome arm 220 may be 360°. Such a range of the circumferential length of each deflector arm 260 and of each dome arm 220 may provide strength and stiffness for withstanding mechanical stresses on the respective deflector arm 260 and on the respective dome arm 220. The circumferential length of each deflector arm 260 and of each dome arm 220 may be chosen as a function of providing strength and stiffness for withstanding mechanical stresses, while minimizing overall weight of the respective deflector panel 240 and of the respective dome panel 202.

The circumferential length of each deflector arm 260 and of each dome arm 220 is defined by an arc angle, also referred to as the angular extent of the deflector arm 260 and of the dome arm 220, respectively. The minimum arc angle of each deflector arm 260 and of each dome arm 220 is defined as $180/Pi \times (2d/2 \times Pi \times R)$, where d is the diameter of the fastening mechanism 270 and R is the length of the fastening mechanism 270. For example, when d is six millimeters, and R is thirty millimeters, the minimum arc angle of the respective deflector arm 260 and of the respective dome arm 220 for one fastening mechanism 270 is four degrees. The maximum arc angle of each deflector arm 260 and of each dome arm 220 is defined as $360/(1.5 \text{ to } 2 \times N)$, where N is the number of bolts on the respective deflector arm 260 and on the respective dome arm 220. The arc angle when three fastening mechanisms 270 are used for the respective deflector arm 260 and for the respective dome arm 220 is sixty degrees.

FIGS. 3A and 3B are front views, taken at line 3-3 in FIG. 2A, of various embodiments of a respective deflector arm 260 of the deflector assembly 160 mounted within a respective dome arm 220 of the annular dome assembly 120. In the embodiment of FIG. 3A, the respective deflector arm 260 and the respective dome arm 220 include a generally arc shape or a generally C-shape in the circumferential direction. In the embodiment of FIG. 3B, the respective deflector arm 260 and the respective dome arm 220 include a generally cylindrical shape or a generally rod-like shape. As discussed above, the respective deflector arm 260 may include a size and/or a shape that generally corresponds to the size and/or the shape of a respective aperture 222 of the respective dome arm 220. It is noted that the gap 259 shown in FIGS. 3A and 3B is for illustrative purposes, and the gap 259 may be smaller.

Referring again to FIG. 2A, when a respective deflector arm 260 of the deflector assembly 160 is disposed within a respective aperture 222 of the annular dome assembly 120, one or more fastening mechanisms 270 may be used to fasten the respective deflector arm 260 to the respective dome arm 220. The one or more fastening mechanisms 270 may include any type of fastening mechanism, such as, for example, studs, bolts, screws, nuts, rivets, braising, welding, or the like. The one or more fastening mechanisms 270 may located at an axial position of a respective deflector arm 260 and a respective dome arm 220 upstream of the dome upstream surface 212 of a respective dome panel 202 of the annular dome assembly 120. Accordingly, the one or more fastening mechanisms 270 may be disposed entirely upstream of the dome upstream surface 212 such that the one or more fastening mechanisms 270 are disposed in cavity 136 and away from the deflector downstream surface 252 (e.g., a hot side) of a respective deflector panel 240 of the deflector assembly 160. In this way, the one or more fastening mechanisms 270 may be located away from the hot combustion gases. Such an arrangement may provide for reduced thermal stress on the deflector assembly 160 and may provide for reduced mechanical stress on the deflector assembly 160.

In the embodiments of FIGS. 2A and 4A, the respective fastening mechanism 270 may include brazing, or a similar material joining process, the respective deflector arm 260 and the respective dome arm 220 together in an area around the second end 263 of the respective deflector arm 260 and the second end 223 of the respective dome arm 220. The brazing is shown schematically in FIGS. 2A and 4A. In the embodiments of FIGS. 4B to 4D, the respective fastening mechanisms 270 may include a bolt, or the like, inserted radially into a respective hole (not shown) of the respective deflector arm 260 and the respective dome arm 220. While a single fastening mechanism 270 is shown at a respective deflector arm 260 and a respective dome arm 220, a plurality of fastening mechanisms 270 may be utilized for securing a respective deflector arm 260 to a respective dome arm 220. For example, a respective deflector arm 260 and a respective dome arm 220 may include two to three, or more, fastening mechanisms 270 associated therewith. In some instances, when a bolt or similar fastening mechanism is utilized, air may leak through around the bolt, the respective deflector arm 260, and the respective dome arm 220. Accordingly, brazing, welding, or a similar fastening mechanism may be utilized instead of, or in combination with, the respective bolt to reduce leakage of air or eliminate leakage of air around the bolt.

FIG. 2A shows the one or more dome panels 202 of the annular dome assembly 120 may include one or more dome feed cooling holes (indicated at dome feed cooling arrows 280) extending from the dome upstream surface 212 to the dome downstream surface 214 of a respective dome panel 202. The one or more dome panels 202 may also include one or more corner cooling holes (indicated at corner cooling arrows 282) extending from the dome upstream surface 212 to the dome downstream surface 214. The one or more deflector panels 240 of the deflector assembly 160 may include one or more multi-hole cooling holes (indicated at multi-hole cooling arrows 284) extending from the deflector upstream surface 250 to the deflector downstream surface 252 of each deflector panel 240. The multi-hole cooling holes are indicated by multi-hole cooling arrows 284.

In operation, cooling air from cavity 136 (e.g., cold, compressed air) may cool the one or more dome arms 220, the one or more deflector arms 260, and/or the one or more fastening mechanisms 270. The cooling air may flow from the cavity 136 and through the one or more dome feed cooling holes (e.g., at the dome feed cooling arrows 280) and into the cavity 211. As indicated by the dome feed cooling arrows 280, the cooling air through the one or more dome feed cooling holes may impinge on the deflector upstream surface 250 of a respective deflector panel 240 of the deflector assembly 160. The cooling air may flow from the cavity 211 and through the one or more multi-hole cooling holes (e.g., at the multi-hole cooling arrows 284) to provide a curtain of cooling air at the deflector downstream surface 252 of a respective deflector panel 240 of the deflector assembly 160. As shown in FIG. 2A, the cooling air may also flow from cavity 136 and through the one or more corner cooling holes (e.g., at the corner cooling arrows 282) and may be directed to the corner 265 of the one or more deflector arms 260 and a respective deflector panel 240 of the deflector assembly 160. In this way, the corner 265 may be provided with additional cooling air to improve cooling at the corner 265.

The one or more dome feed cooling holes, the one or more corner cooling holes, and the one or more multi-hole cooling holes may be sized, shaped, and/or angled, as desired to provide cooling at the deflector upstream surface 250, the deflector downstream surface 252, and the corner 265, respectively. Further, the one or more dome feed cooling holes may include any number of cooling holes located at any radial location and/or any circumferential location of a respective dome panel 202 to provide impingement cooling from the cavity 136 to the deflector upstream surface 250 of a respective deflector panel 240. The one or more corner cooling holes may include any number of cooling holes located at any radial location and/or any circumferential location of a respective dome panel 202 to provide impingement cooling on a respective corner 265 of a respective deflector panel 240. The one or more multi-hole cooling holes may include any number of cooling holes located at any radial location and/or any circumferential location of a respective deflector panel 240 to provide cooling from the cavity 136 to the deflector downstream surface 252 of a respective deflector panel 240.

FIGS. 4A to 4D illustrate cross-sectional views of various embodiments of the annular dome assembly 120 and the deflector assembly 160 isolated from the combustion section 26. The embodiments of FIGS. 4A to 4D include many of the same or similar components and functionality as the embodiment shown in FIG. 2A. The same reference numeral is used for the same or similar components in these embodiments, and a detailed description of these components and functionality is omitted here. Some reference numerals have been removed for clarity.

In the embodiments of FIGS. 4A and 4B, a respective deflector panel 240 of the deflector assembly 160 may include a split panel such that the respective deflector panel 240 includes two or more separate segments 400. A gap 402 may be defined between each respective segment 400 of a deflector panel 240. Each segment 400 may include one or more deflector arms 260 such that each segment 400 may be mounted to and/or removed from a respective dome panel 202 of the annular dome assembly 120 separately. For example, the deflector arms 260 of each segment 400 of a respective deflector panel 240 may be inserted into respective dome arms 220 of a respective dome panel 202 of the annular dome assembly 120. When mounted, the segments 400 may together form a respective deflector panel 240. Segmenting or otherwise splitting a respective deflector panel 240 in such a way may enable ease of removal and/or ease of replacement of a respective segment 400 such that individual segments 400 may be removed and/or may be replaced without the need to remove and/or to replace an entire deflector panel 240. In this way, the segments 400 of a respective deflector panel 240 may enable ease of maintenance if one or more respective segments 400 are damaged. Cooling air may also flow through the gap 402 between respective segments 400 (as indicated by the multi-hole cooling arrows 284 in FIG. 4A FIG. 4B).

In the embodiment of FIG. 4C, the one or more deflector panels 240 of the deflector assembly 160 may include one or more partition arms 460. The one or more partition arms 460 may form a partition between respective segments 400 of a respective deflector panel 240. The one or more partition arms 460 may include a shorter length than the deflector arms 260 of the deflector assembly 160. For example, the partition arms 460 may extend from the deflector upstream surface 250 of the respective deflector panel 240 to the dome downstream surface 214 of the dome panel 202 of the annular dome assembly 120. In this way, the one or more partition arms 460 may not extend through the dome panel 202. The one or more partition arms 460 may also include one or more cooling holes for allowing cooling air to flow therethrough (as indicated by the dome feed cooling arrow 280 in FIG. 4C). In this way, a desired amount of cooling air may be directed through the one or more partition arms 460 to various segments 400 of the respective deflector panel 240.

In the embodiment of FIG. 4D, the one or more dome panels 202 of the annular dome assembly 120 may include two or more dome arms 220. The one or more deflector panels 240 of the deflector assembly 160 may include two or more deflector arms 260 corresponding to the two or more dome arms 220, as detailed above with respect to FIG. 2A. The two or more dome arms 220 and the two or more deflector arms 260 may be located at different circumferential and radial locations, as detailed below. Further, each segment 400 may include a respective deflector arm 260, as detailed above. In this way, each segment 400 may be attached to and/or removed from the respective dome panel 202, separately.

FIG. 5A is a front view of a deflector upstream surface 250 of a respective deflector panel 240 of the deflector assembly 160 and isolated from the annular dome assembly 120. FIG. 5B is a front view of a dome upstream surface 212 of a respective dome panel 202 of the annular dome assembly 120 with a respective deflector panel 240 mounted thereon. For example, the one or more deflector arms 260 are inserted into the respective one or more dome arms 220 (e.g., in the aperture 222) of the respective dome panel 202. The deflector panel 240 is not visible in FIG. 5B due to the respective deflector panel 240 being mounted behind the respective dome panel 202 in such a view. The embodiments of FIGS. 5A and 5B include many of the same or similar components and functionality as the embodiment shown in FIGS. 2A and 4D. The same reference numeral is used for the same or similar components in these embodiments, and a detailed description of these components and functionality is omitted here. Some reference numerals have been removed for clarity.

The deflector panel 240 may include a plurality of deflector arms 260 and the dome panel 202 may include a corresponding plurality of dome arms 220 (FIG. 5B). In the embodiment shown, the deflector panel 240 includes three such deflector arms 260 and the dome panel 202 includes three corresponding dome arms 220. As discussed above, the deflector panel 240 and the dome panel 202 may include any number of the deflector arms 260 and the dome arms 220, respectively. The deflector arms 260 of the deflector panel 240 may be spaced from each other at various arc angles around a radial and circumferential position on the deflector upstream surface 250 of the deflector panel 240. For example, the deflector arms 260 may be spaced around a first circumference 501 that is radially between the opening 144 and the outer circumference of the deflector panel 240. The dome arms 220 may be spaced around the first circumference 501 on the dome panel 202 such that the deflector arms 260 may be generally aligned with the aperture 222 of the respective dome arms 220.

The deflector arms 260 and the dome arms 220 may be located at any radial and/or any circumferential position on the deflector panel 240 and the dome panel 202, respectively. In the embodiment of FIGS. 5A and 5B, the arc angle between each respective deflector arm 260 may be approximately thirty degrees. Such an arc angle may provide for spreading of an axial load or axial forces (shown by arrows 290) on the deflector panel 240 and the dome panel 202 through the deflector arms 260 and the dome arms 220, respectively, from vibrational forces, other mechanical forces, and/or forces from the cooling air. The arc angle between each respective deflector arm 260 may include any angle between thirty degrees and ninety degrees to spread the load on the deflector arms 260 and the dome arms 220. Such a range may provide for improved durability of the deflector arms 260 and the dome arms 220. As further shown in FIG. 5A, the cooling air (as indicated by the dome feed cooling arrows 280) may flow through the dome feed cooling holes of the dome panel 202 and towards the deflector upstream surface 250. The cooling air may follow a general swirl direction and may provide cooling on the deflector arms 260.

Figure 5C:
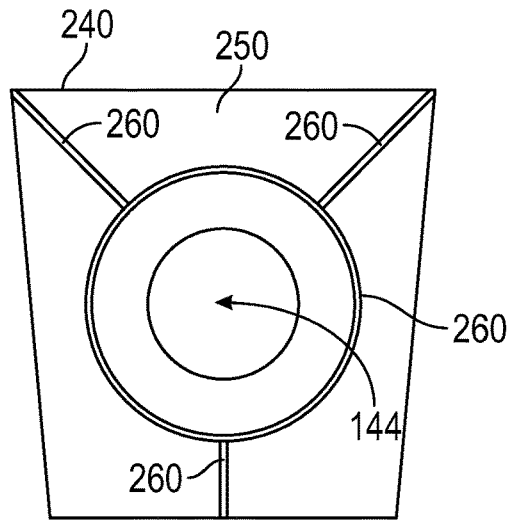
FIG. 5C is a front view of an upstream surface of a portion of another deflector assembly for the annular dome assembly of FIG. 1B, according to aspects of the present disclosure.

FIG. 5C is a front view of a deflector upstream surface 250 of a respective deflector panel 240 of the deflector assembly 160 and isolated from the annular dome assembly 120. As shown in FIG. 5C, the deflector arms 260 may be positioned on the deflector panel 240 at various locations other than circumferentially. For example, the deflector arms 260 may be generally rectilinear, and the dome panels 202 include corresponding apertures 222. FIG. 5C also shows the deflector arms 260 may include a generally circular shape. The deflector arms 260 and the dome arms 220 may, of course, include any size, any shape, and may be arranged in any manner on the respective deflector panel 240 and on the respective dome panel 202, as desired.

Figure 5D:
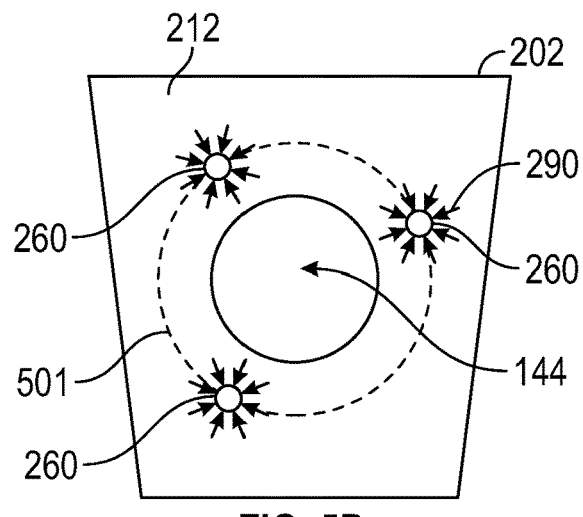
FIG. 5D is a front view of an upstream surface of a portion of another annular dome assembly, according to aspects of the present disclosure.

FIG. 5D is a front view of a dome upstream surface 212 of a respective dome panel 202 of the annular dome assembly 120 with a respective deflector panel 240 mounted thereon. For example, the one or more deflector arms 260 are inserted into the respective one or more dome arms 220 (e.g., in the aperture 222) of the respective dome panel 202. The deflector panel 240 is not visible in FIG. 5D due to the respective deflector panel 240 being mounted behind the respective dome panel 202 in such a view. The embodiment of FIG. 5D includes many of the same or similar components and functionality as the embodiment shown in FIG. 2A and the embodiments shown in FIGS. 5A to 5C. The same reference numeral is used for the same or similar components in these embodiments, and a detailed description of these components and functionality is omitted here. Some reference numerals have been removed for clarity. In the embodiment of FIG. 5D, the one or more deflector arms 260 may include a generally cylindrical shape or a generally rod-like shape similar to the embodiment of FIG. 3B. The cooling air may be supplied to each deflector arm 260 around an entire circumference thereof (as indicated by the arrows 290).

Figure 6A:
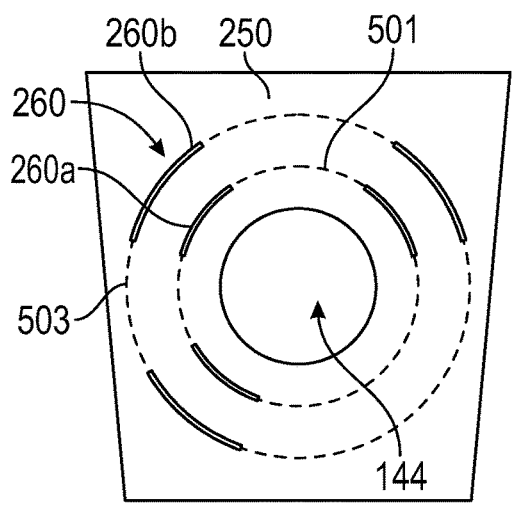
FIG. 6A is a front view of an upstream surface of a portion of another deflector assembly for the annular dome assembly of FIG. 1B, according to aspects of the present disclosure.
Figure 6B:
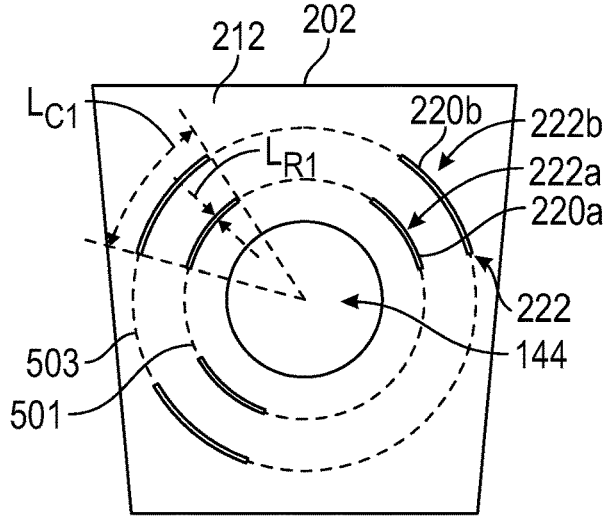
FIG. 6B is a front view of an upstream surface of a portion of another annular dome assembly, according to aspects of the present disclosure.

FIG. 6A is a front view of a deflector upstream surface 250 of a respective deflector panel 240 of the deflector assembly 160 and isolated from the annular dome assembly 120, according to another embodiment. FIG. 6B is a front view of a dome upstream surface 212 of a respective dome panel 202 of the annular dome assembly 120, according to another embodiment. The embodiments of FIGS. 6A and 6B include many of the same or similar components and functionality as the embodiment shown in FIGS. 2A to 5B. The same reference numeral is used for the same or similar components in these embodiments, and a detailed description of these components and functionality is omitted here. Some reference numerals have been removed for clarity.

In the embodiment of FIG. 6A, the one or more deflector arms 260 of the deflector panel 240 may be located at different radial and/or circumferential positions on the deflector panel 240. For example, deflector panel 240 in FIG. 6A includes first deflector arms 260*a* located around a first circumference 501 having a first diameter. The deflector panel 240 also includes second deflector arms 260*b* located around a second circumference 503 having a second diameter that is greater than the first diameter. For clarity, only one first deflector arm 260*a* and one second deflector arm 260*b* is labeled in FIG. 6A. The deflector panel 240 may include deflector arms 260 at either or at both the first circumference 501 and the second circumference 503. The deflector arms 260 may, of course, be located anywhere on the deflector upstream surface 250 of the deflector panel 240 for providing a circumferential spread of the one or more deflector arms 260 to distribute mechanical stresses, as detailed above.

As shown in FIG. 6B, the dome arms 220 may be located at different radial and/or circumferential positions on the dome panel 202. The dome arms 220 may be arranged on the dome upstream surface 212 such that the apertures 222 align with the corresponding deflector arms 260 (FIG. 6A) when the deflector panel 240 is mounted to the dome panel 202. For example, the dome panel 202 includes first dome arms 220a and first apertures 222a located around the first circumference 501. Similarly, the dome panel 202 also includes second dome arms 220b and second apertures 222b located around the second circumference 503. In this way, the first deflector arms 260a may align with, and be inserted into, the first apertures 222a, and the second deflector arms 260b may align with, and be inserted into, the second apertures 222b. For clarity, only one first dome arm 220a, one first aperture 222a, one second dome arm 220b, and one second aperture 222b are labeled in FIG. 6B.

Figure 7A:
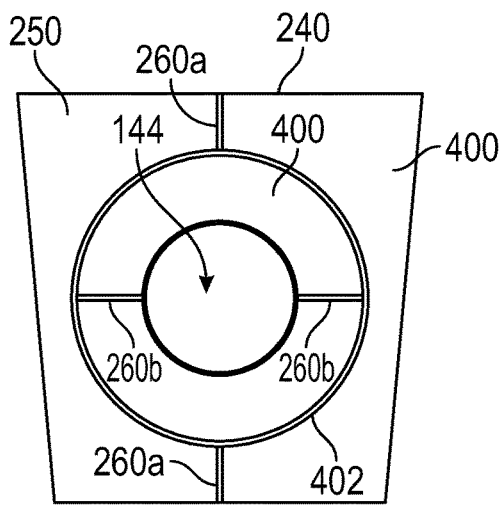
FIG. 7A is a front view of an upstream surface of a portion of another deflector assembly for the annular dome assembly, according to aspects of the present disclosure.
Figure 7B:
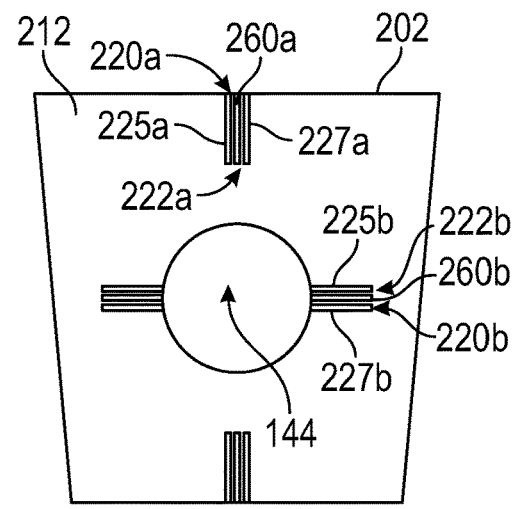
FIG. 7B is a front view of an upstream surface of a portion of another annular dome assembly, according to aspects of the present disclosure.

FIG. 7A is a front view of a deflector upstream surface 250 of a respective deflector panel 240 of the deflector assembly 160 and isolated from the annular dome assembly 120, according to another embodiment. FIG. 7B is a front view of a dome upstream surface 212 of a respective dome panel 202 of the annular dome assembly 120 with a respective deflector panel 240 mounted thereon, according to another embodiment. For example, the one or more deflector arms 260 of FIG. 7A are inserted into the respective one or more dome arms 220 (e.g., in the aperture 222) of the respective dome panel 202 of FIG. 7B. The deflector panel 240 is not visible in FIG. 7B due to the respective deflector panel 240 being mounted behind the respective dome panel 202 in such a view. The embodiments of FIGS. 7A and 7B include many of the same or similar components and functionality as those in the embodiments shown in FIGS. 2A and 4D. The same reference numeral is used for the same or similar components in these embodiments, and a detailed description of these components and functionality is omitted here. Some reference numerals have been removed for clarity.

As shown in FIG. 7A, the deflector panel 240 includes first deflector arms 260a and second deflector arms 260b. In the embodiment shown, the first deflector arms 260a may include two such deflector arms, and the second deflector arms 260b may include two such deflector arms. Thus, the deflector panel 240 includes four deflector arms. The first deflector arms 260a and the second deflector arms 260b may be spaced from each other at various arc angles around a radial and circumferential position on the deflector upstream surface 250 of the deflector panel 240. In the embodiments of FIG. 7A, the arc angle between the first deflector arms 260a and the second deflector arms 260b may be approximately ninety degrees. Such an arc angle may provide for spreading of an axial load or axial forces on the deflector panel 240 through the first deflector arms 260a and the second deflector arms 260b from vibrational forces, other mechanical forces, and/or forces from the cooling air. As further shown in FIG. 7A, the first deflector arms 260a and the second deflector arms 260b are generally rectilinear. The first deflector arms 260a are spaced radially from the opening 144 (e.g., at the mixer assembly 142) and extend in a generally radial direction. The second deflector arms 260b extend from the opening 144 and extend in a generally circumferential direction.

As shown in FIG. 7B, the dome panel 202 includes first dome arms 220a and second dome arms 220b. Only one such first dome arm 220a and one such second dome arm 220b is labeled in FIG. 7B for clarity. In the embodiment shown, the first dome arms 220a may include two such dome arms, and the second dome arms 220b may include two such dome arms. Thus, the dome panel 202 includes four dome arms. Each first dome arm 220a includes a corresponding first member 225a and a corresponding second member 227b. Likewise, each second dome arm 220b includes a corresponding first member 225b and a corresponding second member 227b. In this way, the first dome arms 220a define first apertures 222a and the second dome arms 220b define second apertures 222b. The first dome arms 220a and the second dome arms 220b may be spaced from each other at various arc angles around a radial and circumferential position on the dome upstream surface 212 of the dome panel 202. In this way, the first deflector arms 260a align with the first apertures 222a and the second deflector arms 260b align with the second apertures 222b when the deflector panel 240 is mounted to the dome panel 202 (FIG. 7B). In the embodiments of FIG. 7B, the arc angle between the first dome arms 220a and the second dome arms 220b may be approximately ninety degrees. Such an arc angle may provide for spreading of an axial load or axial forces on the dome panel 202 through the first dome arms 220a and the second dome arms 220b from vibrational forces, other mechanical forces, and/or forces from the cooling air. As further shown in FIG. 7B, the first dome arms 220a and the second dome arms 220b are generally rectilinear, such that the first apertures 222a and the second apertures 222b are generally rectilinear. In this way, a size, a shape, and a position of the first apertures 222a and the second apertures 222b generally correspond to a size, a shape, and a position of the first deflector arms 260a and the second deflector arms 260b, respectively.

FIGS. 8A to 8D provide front views of a deflector downstream surface 252 of a respective deflector panel 240 of the deflector assembly 160 and isolated from the annular dome assembly 120, according to various embodiments. The embodiments of FIGS. 8A to 8D include many of the same or similar components and functionality as the embodiment shown in FIGS. 2A and 4D. The embodiments of FIGS. 8A to 8D are substantially similar to the embodiment of FIG. 6A. The same reference numeral is used for the same or similar components in these embodiments, and a detailed description of these components and functionality is omitted here. Some reference numerals have been removed for clarity.

Figure 8A:
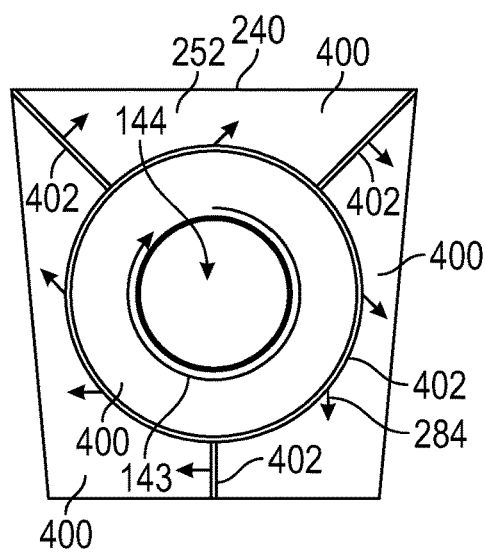
FIG. 8A is a front view of a downstream surface of another deflector assembly for the annular dome assembly, according to aspects of the present disclosure.

In the embodiment of FIG. 8A, the deflector panel 240 may include a plurality of segments 400 separated by a plurality of gaps 402. For example, the deflector panel 240 may include four such segments 400 separated by four respective gaps 402. Although not illustrated in FIG. 8A, each segment 400 may include one or more deflector arms 260 (e.g., extending from the deflector upstream surface 250) for mounting the respective segment 400 to the annular dome assembly 120, as detailed above. The gaps 402 may include one or more generally circular gaps and one or more generally rectilinear gaps. In this way, the deflector panel 240 may include segments 400 of various shapes and/or sizes. As shown in FIG. 8A, the cooling air may flow through the gaps 402 and provide film cooling on the downstream surface 250 (e.g., the hot side) of the respective deflector panel 240 (as indicated by the multi-hole cooling arrows 284). The cooling air may follow a general swirl direction (as indicated by the arrow 143).

Figure 8B:
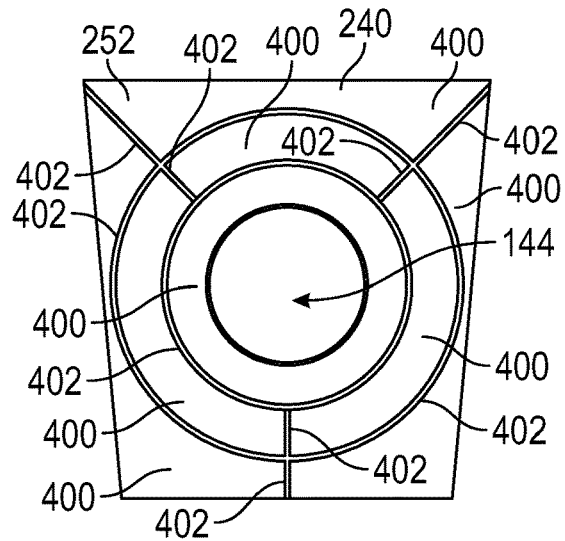
FIG. 8B is a front view of a downstream surface of another deflector assembly for the annular dome assembly, according to aspects of the present disclosure.

In the embodiment of FIG. 8B, the deflector panel 240 may include a plurality of segments 400 separated by a plurality of gaps 402. For example, the deflector panel 240 may include seven such segments 400 separated by eight respective gaps 402. Although not illustrated in FIG. 8B, each segment 400 may include one or more deflector arms 260 (e.g., extending from the deflector upstream surface 250) for mounting the respective segment 400 to the annular dome assembly 120, as detailed above. The gaps 402 may include one or more generally circular gaps and one or more generally rectilinear gaps. In this way, the deflector panel 240 may include segments 400 of various shapes and/or various sizes.

Figure 8C:
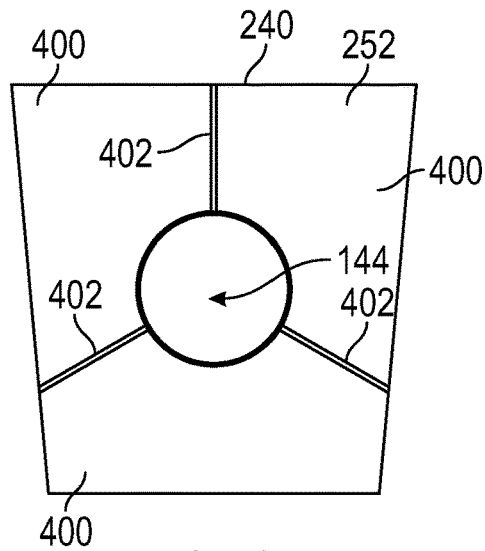
FIG. 8C is a front view of a downstream surface of another deflector assembly for the annular dome assembly, according to aspects of the present disclosure.

In the embodiment of FIG. 8C, the deflector panel 240 may include a plurality of segments 400 separated by a plurality of gaps 402. For example, the deflector panel 240 may include three such segments 400 separated by three respective gaps 402. Although not illustrated in FIG. 8C, each segment 400 may include one or more deflector arms 260 (e.g., extending from the deflector upstream surface 250) for mounting the respective segment 400 to the annular dome assembly 120, as detailed above. The gaps 402 may include one or more generally rectilinear gaps at various radial positions and/or various circumferential positions on the deflector panel 240. For example, the gaps 402 may be positioned every one hundred twenty degrees. In this way, the deflector panel 240 may include segments 400 of various shapes and/or various sizes.

Figure 8D:
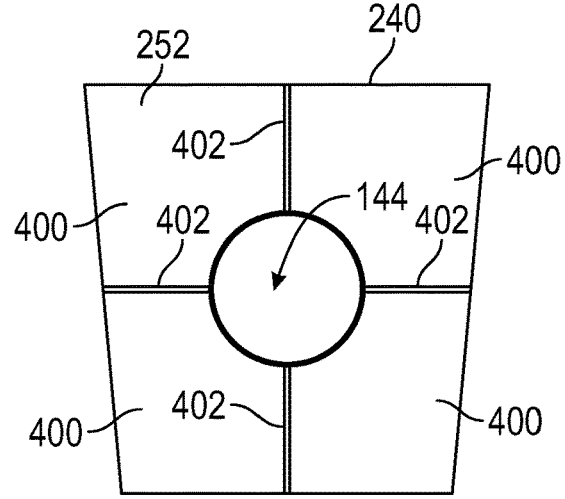
FIG. 8D is a front view of a downstream surface of another deflector assembly for the annular dome assembly, according to aspects of the present disclosure.

In the embodiment of FIG. 8D, the deflector panel 240 may include a plurality of segments 400 separated by a plurality of gaps 402. For example, the deflector panel 240 may include four such segments 400 separated by four respective gaps 402. Although not illustrated in FIG. 8D, each segment 400 may include one or more deflector arms 260 (e.g., extending from the deflector upstream surface 250) for mounting the respective segment 400 to the annular dome assembly 120, as detailed above. The gaps 402 may include one or more generally rectilinear gaps at various radial positions and/or various circumferential positions on the deflector panel 240. For example, the gaps 402 may be positioned every ninety degrees. In this way, the deflector panel 240 may include segments 400 of various shapes and/or various sizes.

FIGS. 9A to 9D provide cross-sectional views of a respective gap 402 of a respective deflector panel 240 of the deflector assembly 160, according to various embodiments. The embodiments of FIGS. 9A to 9D include many of the same or similar components and functionality as those in the embodiments shown in FIGS. 2A to 8D. The same reference numeral is used for the same or similar components in these embodiments, and a detailed description of these components and functionality is omitted here. Some reference numerals have been removed for clarity.

Figure 9A:
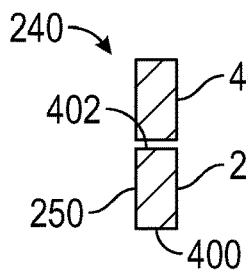
FIG. 9A is an enlarged view of one or more gaps of the deflector assembly of FIG. 4A, according to aspects of the present disclosure.
Figure 9B:
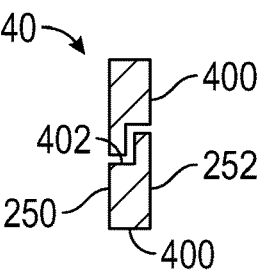
FIG. 9B is an enlarged view of another embodiment of the one or more gaps, according to aspects of the present disclosure.
Figure 9C:
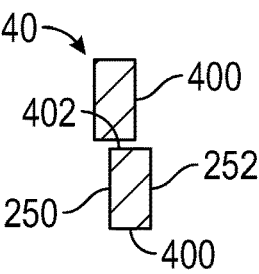
FIG. 9C is an enlarged view of another embodiment of the one or more gaps, according to aspects of the present disclosure.
Figure 9D:
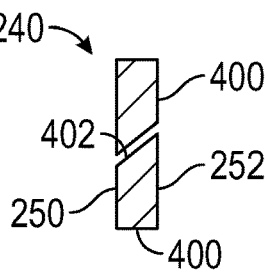
FIG. 9D is an enlarged view of another embodiment of the one or more gaps, according to aspects of the present disclosure.

In the embodiment of FIG. 9A, the gap 402 may extend from the deflector upstream surface 250 to the deflector downstream surface 252 of the deflector panel 240. For example, the gap 402 may extend generally axially through the deflector panel 240. In the embodiment of FIG. 9B, the gap 402 may include a step such that respective segments 400 may overlap. In this way, an upstream portion of the gap 402 may be radially inward compared to a downstream portion of the gap 402. In some examples, the upstream portion of the gap 402 may be radially outward from the downstream portion of the gap 402. The step of the gap 402 may include any size, shape, and/or angle, as desired. In the embodiment of FIG. 9C, the gap 402 may be axially misaligned such that respective segments 400 overlap. For example, a first segment 400 may be positioned axially closer to the annular dome assembly 120 than a second segment 400 when the deflector panel 240 is mounted to the annular dome assembly 120. In the embodiment of FIG. 9D, the gap 402 may include an axial angle such that the gap 402 does not extend generally axially. The axial angle may be between zero degrees and seventy-five degrees to direct the flow of cooling air to the deflector downstream surface 252. Such a range may provide the flow cooling air from the deflector upstream surface 250 to the deflector downstream surface 252 for film cooling the deflector downstream surface 252.

Figure 10A:
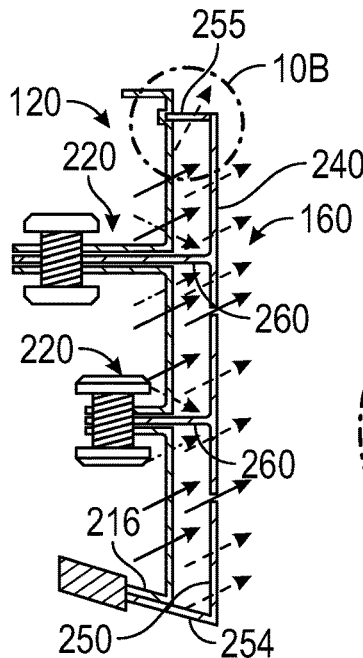
FIG. 10A is a schematic partial cross-sectional view of a portion of another annular dome assembly of the combustion section, according to aspects of the present disclosure.
Figure 10B:
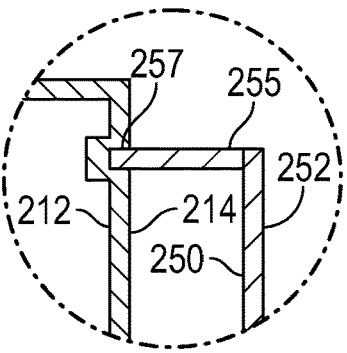
FIG. 10B is an enlarged cross-sectional view, taken at detail 10B in FIG. 10A, of the annular dome assembly and the deflector assembly.
Figure 10C:
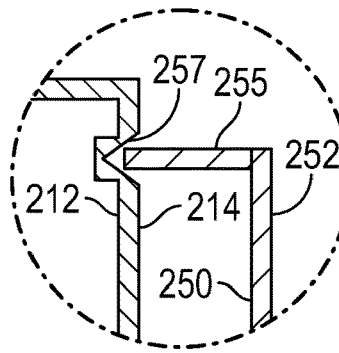
FIG. 10C is an enlarged cross-sectional view of another embodiment of the annular dome assembly and the deflector assembly.
Figure 11A:
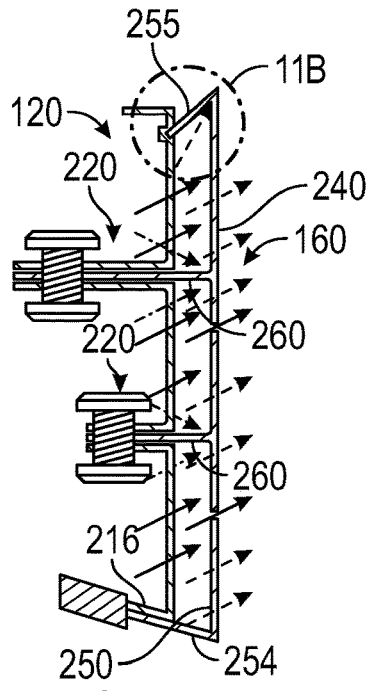
FIG. 11A is a schematic partial cross-sectional view of a portion of another annular dome assembly, according to aspects of the present disclosure.
Figure 11B:
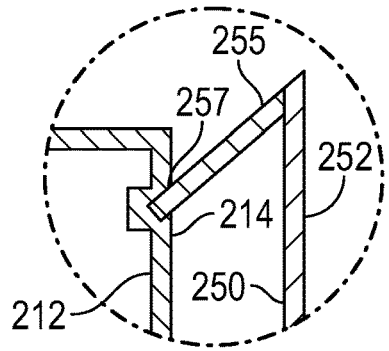
FIG. 11B is an enlarged cross-sectional view, taken at detail 11B in FIG. 11A, of the annular dome assembly and the deflector assembly.

FIGS. 10A and 11A illustrate cross-sectional views of various embodiments of the annular dome assembly 120 and the deflector assembly 160 isolated from the combustion section 26. FIGS. 10B and 10C are various enlarged cross-sectional views of the annular dome assembly 120 and the deflector assembly 160, taken at detail 10B in FIG. 10A, according to aspects of the present disclosure. FIG. 11B is an enlarged cross-sectional view of the annular dome assembly 120 and the deflector assembly 160, taken at detail 11B in FIG. 11A, according to aspects of the present disclosure. The embodiments of FIGS. 10A to 11B include many of the same or similar components and functionality as those in the embodiment shown in FIG. 2A. The same reference numeral is used for the same or similar components in these embodiments, and a detailed description of these components and functionality is omitted here. Some reference numerals have been removed for clarity.

In the embodiment of FIG. 10A, the axially extending member 255 may extend substantially axially from the deflector upstream surface 250 of the deflector panel 240. When the deflector panel 240 is mounted to the annular dome assembly 120, a free end of the axially extending member 255 may be inserted into a respective groove 257 on the dome downstream surface 214 of a respective dome panel 202 of the annular dome assembly 120. In the embodiment of FIG. 10B, the groove 257 may be sized and/or may be shaped to generally correspond to a size and/or a shape of the axially extending member 255 such that the free end of the axially extending member 255 may fit into the groove 257 with a low amount of clearance. In the embodiment of FIG. 10C, the groove 257 may include an angled surface such that the free end of the axially extending member 255 may sit in the groove 257 on the angled surface. The connection between the axially extending member 255 and the groove 257 may also be sealed by, for example, adhesive, welding, brazing, or the like.

In the embodiment of FIG. 11A, the axially extending member 255 may extend at an axial angle from the deflector upstream surface 250 of the deflector panel 240. For example, the axial angle of the axially extending member 255 may be between plus or minus forty five degrees (±45°). The axial angle of the axially extending member 255 may help direct the cooling air at an angle to the outer liner 102 and/or to the inner liner 104. Thus, the axial angle of the axially extending member 255 may help prevent hot gas ingestion and provide for improved cooling around the corners of the deflector assembly 160. When the deflector panel 240 is mounted to the annular dome assembly 120, a free end of the axially extending member 255 may be inserted into a respective groove 257 on the dome downstream surface 214 of a respective dome panel 202 of the annular dome assembly 120. In the embodiment of FIG. 11B, the groove 257 may be sized and/or shaped to generally correspond to a size and/or a shape of the axially extending member 255 such that the free end of the axially extending member 255 may fit into the groove 257 with a low amount of clearance. The connection between the axially extending member 255 and the groove 257 may also be sealed by, for example, adhesive, welding, brazing, or the like.

In some examples, the axially extending member 255 includes a seal such that the seal axially extends between the dome downstream surface 214 of the dome panel 202 and the upstream surface 252 of the dome panel 202. In this way, the cavity 211 between the annular dome assembly 120 and the deflector assembly 160 may be sealed to control air leakage. In some examples, the axially extending member 255 may include one or more cooling holes therethrough for providing cooling air to a radially outer surface of the deflector assembly 160 and/or to other components (e.g., the outer liner 102 and/or the inner liner 104).

Further aspects of the present disclosure are provided by the subject matter of the following clauses.

An annular dome assembly for a combustor, the annular dome assembly including an annular and a deflector assembly. The annular dome includes one or more dome panels defining the annular dome. A first dome panel of the one or more dome panels includes a dome upstream surface and a dome downstream surface, one or more dome arms, and one or more apertures. The dome downstream surface is opposite the dome upstream surface. The one or more dome arms extend from the dome upstream surface. The one or more apertures extend from the dome upstream surface to the dome downstream surface. The deflector assembly includes one or more deflector panels defining the deflector assembly. A first deflector panel of the one or more deflector panels includes a deflector upstream surface and a deflector downstream surface and one or more deflector arms. The deflector downstream surface is opposite the deflector upstream surface. The one or more deflector arms extend from the deflector upstream surface. Each of the one or more deflector arms are mounted within a respective aperture of the annular dome.

The annular dome assembly of the preceding clause, the one or more dome arms defining the one or more apertures.

The annular dome assembly of any preceding clause, the one or more dome arms and the one or more deflector arms being secured together by one or more fastening mechanisms.

The annular dome assembly of any preceding clause, the one or more deflector arms being generally C-shaped.

The annular dome assembly of any preceding clause, the one or more deflector arms being generally cylindrical shaped or generally rod-like shaped.

The annular dome assembly of any preceding clause, the first dome panel including one or more corner cooling holes for directing a flow of cooling air onto a corner formed between the one or more deflector arms and the deflector upstream surface of the first deflector panel.

The annular dome assembly of any preceding clause, a connection of the one or more deflector arms with the deflector upstream surface including a blended corner.

The annular dome assembly of any preceding clause, the first deflector panel further including an axially extending member at a radially outer end. The axially extending member is mounted within a respective groove on the dome downstream surface of the first dome panel.

The annular dome assembly of any preceding clause, the axially extending member including a seal.

The annular dome assembly of any preceding clause, the one or more deflector arms including a plurality of deflector arms. Each of the plurality of deflector arms are spaced circumferentially around the deflector upstream surface of the first deflector panel.

The annular dome assembly of any preceding clause, the plurality of deflector arms being circumferentially spaced apart from each other at an arc angle between thirty degrees and ninety degrees.

The annular dome assembly of any preceding clause, the first deflector panel each including a plurality of segments.

The annular dome assembly of any preceding clause, each of the plurality of segments including one or more of the one or more deflector arms.

The annular dome assembly of any preceding clause, a flow of cooling air being directed through one or more gaps formed between each of the plurality of segments.

The annular dome assembly of any preceding clause, further including one or more gaps formed between each of the plurality of segments, the one or more gaps being shaped to provide a flow of cooling air to the deflector downstream surface of each of the first deflector panel.

An annular dome assembly for a combustor, the annular dome assembly including an annular dome, a deflector assembly, and a one or more fastening mechanisms. The annular dome includes one or more dome panels defining the annular dome. A first dome panel of the one or more dome panels including a dome upstream surface and a dome downstream surface, one or more dome arms, and one or more apertures. The downstream surface is opposite the dome upstream surface. The one or more dome arms extend from the dome upstream surface. The one or more apertures defined by the one or more dome arms and extending from the dome upstream surface to the dome downstream surface. The deflector assembly includes one or more deflector panels defining the deflector assembly. A first deflector panel of the one or more deflector panels including a deflector upstream surface and a deflector downstream surface, one or more deflector arms, and a plurality of segments. The deflector downstream surface is opposite the deflector upstream surface. The one or more deflector arms extend from the deflector upstream surface. Each of the one or more deflector arms mounted within a respective aperture of the annular dome. The plurality of segments are separated by one or more gaps, where each of the plurality of segments include one or more of the one or more deflector arms. The ne or more fastening mechanisms fasten the one or more dome arms and the one or more deflector arms together.

The annular dome assembly of any preceding clause, the first dome panel including one or more corner cooling holes for directing a flow of cooling air onto a corner formed between the one or more deflector arms and the deflector upstream surface of the first deflector panel.

The annular dome assembly of any preceding clause, the one or more deflector arms including a plurality of deflector arms. Each of the plurality of deflector arms are spaced circumferentially around the deflector upstream surface of the first deflector panel.

The annular dome assembly of any preceding clause, the first deflector panel further including an axially extending member at a radially outer end. The axially extending member is mounted within a respective groove on the dome downstream surface of the first dome panel.

The annular dome assembly of any preceding clause, the axially extending member including a seal.

The annular dome assembly of any preceding clause, the one or more deflector arms being generally C-shaped.

The annular dome assembly of any preceding clause, the one or more deflector arms being generally cylindrical shaped or generally rod-like shaped.

The annular dome assembly of any preceding clause, a connection of the one or more deflector arms with the deflector upstream surface including a blended corner.

The annular dome assembly of any preceding clause, a flow of cooling air being directed the through one or more gaps.

The annular dome assembly of the preceding clause, the one or more gaps being shaped to provide a flow of cooling air to the deflector downstream surface of each of the first deflector panel.

The annular dome assembly of any preceding clause, the first dome panel further including an axially extending wall that defines a portion of an opening of the first dome panel.

The annular dome assembly of the preceding clause, the axially extending wall being angled to correspond to an angle of a mixer assembly such that the mixer assembly is inserted into the opening.

The annular dome assembly of any preceding clause, each of the one or more dome arms including a first member and a second member that together define a respective dome arm of the one or more dome arms.

The annular dome assembly of the preceding clause, the first member being radially spaced from the second member such that the first member and the second member define a respective aperture of the one or more apertures.

The annular dome assembly of any preceding clause, the first deflector panel further including an axially extending wall that defines a portion of an opening of the first deflector panel.

The annular dome assembly of the preceding clause, the axially extending wall being angled to correspond to an angle of a mixer assembly such that the mixer assembly is inserted into the opening.

The annular dome assembly of any preceding clause, an axial length of each of the one or more deflector arms is a function of a diameter of a fastening mechanism that secures the one or more dome arms and the one or more deflector arms together.

The annular dome assembly of the preceding clause, the axial length of each of the one or more deflector arms being at least two times the diameter of the fastening mechanism.

The annular dome assembly of the preceding clause, the axial length of each of the one or more deflector arms being less than eight times the diameter of the fastening mechanism.

The annular dome assembly of any preceding clause, a radial length of each of the one or more deflector arms generally corresponding to a diameter of each of the one or more apertures.

The annular dome assembly of the preceding clause, a minimum radial length of each of the one or more deflector arms being a same thickness of the first deflector panel.

The annular dome assembly of the preceding clause, a maximum radial length of each of the one or more deflector arms being two times the thickness of the first deflector panel.

The annular dome assembly of any preceding clause, a circumferential length of each of the one or more deflector arms generally corresponding to a circumferential length of each of the one or more dome arms.

The annular dome assembly of the preceding clause, a minimum circumferential length of each of the one or more deflector arms being two times a diameter of a fastening mechanism that secures the one or more dome arms and the one or more deflector arms together.

The annular dome assembly of the preceding clause, a maximum circumferential length of each of the one or more deflector arms being three hundred sixty degrees.

The annular dome assembly of any preceding clause, a circumferential length of each of the one or more deflector arms being defined by an arc angle.

The annular dome assembly of the preceding clause, a minimum arc angle of each of the one or more deflector arms being defined as $180/Pi\times(2d/2\times Pi\times R)$, where d is the diameter of a fastening mechanism and R is the length of the fastening mechanism.

The annular dome assembly of the preceding clause, a maximum arc angle of each of the one or more deflector arms being define as $360/(1.5$ to $2\times N)$, where N is the number of fastening mechanisms on a respective deflector arm of the one or more deflector arms.

The annular dome assembly of any preceding clause, the one or more fastening mechanisms being disposed entirely upstream of the dome upstream surface.

The annular dome assembly of any preceding clause, the one or more fastening mechanisms including brazing.

The annular dome assembly of any preceding clause, the one or more fastening mechanisms including rivets.

The annular dome assembly of any preceding clause, the one or more fastening mechanisms including bolts.

The annular dome assembly of any preceding clause, the first dome panel including one or more dome feed cooling holes extending from the dome upstream surface to the dome downstream surface.

The annular dome assembly of any preceding clause, the first deflector panels including one or more multi-hole cooling holes extending from the deflector upstream surface to the deflector downstream surface.

The annular dome assembly of any preceding clause, the first deflector panel including one or more partition arms that form a partition between respective segments of the first deflector panel.

The annular dome assembly of any preceding clause, the one or more partition arms axially extending from the deflector upstream surface of the first deflector panel to the dome upstream surface of the first dome panel.

The annular dome assembly of any preceding clause, the one or more partition arms including one or more cooling holes.

The annular dome assembly of any preceding clause, the one or more deflector arms including a first set of deflector arms being circumferentially spaced around a first circumference on the first deflector panel, the first circumference having a first diameter.

The annular dome assembly of any preceding clause, the one or more deflector arms including a second set of deflector arms being circumferentially spaced around a second circumference on the first deflector panel, the second circumference having a second diameter, the second diameter being greater than the first diameter.

The annular dome assembly of any preceding clause, the one or more deflector arms including a plurality of deflector arms being spaced circumferentially around the deflector upstream surface of the first deflector panel at an arc angle of thirty degrees.

The annular dome assembly of any preceding clause, the one or more deflector arms including a plurality of deflector arms being spaced circumferentially around the deflector upstream surface of the first deflector panel at an arc angle of ninety degrees.

The annular dome assembly of any preceding clause, the first deflector panel including a plurality of segments separated by a plurality of gaps, the plurality of gaps being generally circular.

The annular dome assembly of any preceding clause, the first deflector panel including a plurality of segments separated by a plurality of gaps, the plurality of gaps being generally rectilinear.

The annular dome assembly of any preceding clause, the first deflector panel including a plurality of segments separated by a plurality of gaps, the plurality of segments including three segments.

The annular dome assembly of any preceding clause, the first deflector panel including a plurality of segments separated by a plurality of gaps, the plurality of segments including four segments.

The annular dome assembly of any preceding clause, the first deflector panel including a plurality of segments separated by a plurality of gaps, the plurality of segments including seven segments.

The annular dome assembly of any preceding clause, the first deflector panel including a plurality of segments separated by a plurality of gaps, the plurality of gaps being positioned every one hundred and twenty degrees around the first deflector panel.

The annular dome assembly of any preceding clause, the first deflector panel including a plurality of segments separated by a plurality of gaps, the plurality of gaps being positioned every ninety degrees around each of the first deflector panel.

The annular dome assembly of any preceding clause, the first deflector panel including a plurality of segments separated by a plurality of gaps, the plurality of gaps extending generally axially through each of the first deflector panel.

The annular dome assembly of any preceding clause, the first deflector panel each including a plurality of segments separated by a plurality of gaps, the plurality of gaps including a step such that respective segments of the plurality of segments overlap.

The annular dome assembly of any preceding clause, the first deflector panel including a plurality of segments separated by a plurality of gaps, the plurality of gaps being misaligned such that respective segments of the plurality of segments overlap.

The annular dome assembly of any preceding clause, the first deflector panel including a plurality of segments separated by a plurality of gaps, the plurality of gaps extending at an axial angle between zero degrees and seventy-five degrees.

The annular dome assembly of any preceding clause, the first deflector panel further including an axially extending member at a radially outer end. The axially extending member is mounted within a respective groove on the dome downstream surface of the first dome panel, the groove including an angled surface.

The annular dome assembly of any preceding clause, the axially extending member being mounted within a respective groove on the dome downstream surface of the first dome panel, the axially extending member being sized and shaped to generally correspond to a size and a shape of the groove.

The annular dome assembly of any preceding clause, the axially extending member extending at an axial angle from the deflector upstream surface, the axial angle being between plus or minus forty-five degrees.

The annular dome assembly of any preceding clause, axially extending wall being mounted within a respective groove on the dome downstream surface of the first dome panel, a connection between the axially extending wall and the groove being sealed.

A turbine engine including a combustion section. The combustion section includes an annular dome assembly. The annular dome assembly includes an annular dome and a deflector assembly. The annular dome includes one or more dome panels defining the annular dome. A first dome panel of the one or more dome panels includes a dome upstream surface and a dome downstream surface, one or more dome arms, and one or more apertures. The dome downstream surface is opposite the dome upstream surface. The one or more dome arms extend from the dome upstream surface. The one or more apertures extend from the dome upstream surface to the dome downstream surface. The deflector assembly includes one or more deflector panels defining the deflector assembly. A first deflector panel of the one or more deflector panels includes a deflector upstream surface and a deflector downstream surface and one or more deflector arms. The deflector downstream surface is opposite the deflector upstream surface. The one or more deflector arms extend from the deflector upstream surface. Each of the one or more deflector arms are mounted within a respective aperture of the annular dome.

The turbine engine of the preceding clause, the one or more dome arms defining the one or more apertures.

The turbine engine of any preceding clause, the one or more dome arms and the one or more deflector arms being secured together by one or more fastening mechanisms.

The turbine engine of any preceding clause, the one or more deflector arms being generally C-shaped.

The turbine engine of any preceding clause, the one or more deflector arms being generally cylindrical shaped or generally rod-like shaped.

The turbine engine of any preceding clause, the first dome panel including one or more corner cooling holes for directing a flow of cooling air onto a corner formed between the one or more deflector arms and the deflector upstream surface of the first deflector panel.

The turbine engine of any preceding clause, a connection of the one or more deflector arms with the deflector upstream surface including a blended corner.

The turbine engine of any preceding clause, the first deflector panel further including an axially extending member at a radially outer end. The axially extending member is mounted within a respective groove on the dome downstream surface of the first dome panel.

The turbine engine of any preceding clause, the axially extending member including a seal.

The turbine engine of any preceding clause, the one or more deflector arms including a plurality of deflector arms. Each of the plurality of deflector arms are spaced circumferentially around the deflector upstream surface of the first deflector panel.

The turbine engine of any preceding clause, the plurality of deflector arms being circumferentially spaced apart from each other at an arc angle between thirty degrees and ninety degrees.

The turbine engine of any preceding clause, the first deflector panel each including a plurality of segments.

The turbine engine of any preceding clause, each of the plurality of segments including one or more of the one or more deflector arms.

The turbine engine of any preceding clause, a flow of cooling air being directed through one or more gaps formed between each of the plurality of segments.

The turbine engine of any preceding clause, further including one or more gaps formed between each of the plurality of segments, the one or more gaps being shaped to provide a flow of cooling air to the deflector downstream surface of each of the first deflector panel.

The turbine engine of any preceding clause, the first dome panel further including an axially extending wall that defines a portion of an opening of the first dome panel.

The turbine engine of the preceding clause, the axially extending wall being angled to correspond to an angle of a mixer assembly such that the mixer assembly is inserted into the opening.

The turbine engine of any preceding clause, each of the one or more dome arms including a first member and a second member that together define a respective dome arm of the one or more dome arms.

The turbine engine of the preceding clause, the first member being radially spaced from the second member such that the first member and the second member define a respective aperture of the one or more apertures.

The turbine engine of any preceding clause, the first deflector panel further including an axially extending wall that defines a portion of an opening of the first deflector panel.

The turbine engine of the preceding clause, the axially extending wall being angled to correspond to an angle of a mixer assembly such that the mixer assembly is inserted into the opening.

The turbine engine of any preceding clause, an axial length of each of the one or more deflector arms is a function of a diameter of a fastening mechanism that secures the one or more dome arms and the one or more deflector arms together.

The turbine engine of the preceding clause, the axial length of each of the one or more deflector arms being at least two times the diameter of the fastening mechanism.

The turbine engine of the preceding clause, the axial length of each of the one or more deflector arms being less than eight times the diameter of the fastening mechanism.

The turbine engine of any preceding clause, a radial length of each of the one or more deflector arms generally corresponding to a diameter of each of the one or more apertures.

The turbine engine of the preceding clause, a minimum radial length of each of the one or more deflector arms being a same thickness of the first deflector panel.

The turbine engine of the preceding clause, a maximum radial length of each of the one or more deflector arms being two times the thickness of the first deflector panel.

The turbine engine of any preceding clause, a circumferential length of each of the one or more deflector arms generally corresponding to a circumferential length of each of the one or more dome arms.

The turbine engine of the preceding clause, a minimum circumferential length of each of the one or more deflector arms being two times a diameter of a fastening mechanism that secures the one or more dome arms and the one or more deflector arms together.

The turbine engine of the preceding clause, a maximum circumferential length of each of the one or more deflector arms being three hundred sixty degrees.

The turbine engine of any preceding clause, a circumferential length of each of the one or more deflector arms being defined by an arc angle.

The turbine engine of the preceding clause, a minimum arc angle of each of the one or more deflector arms being defined as $180/Pi \times (2d/2 \times Pi \times R)$, where d is the diameter of a fastening mechanism and R is the length of the fastening mechanism.

The turbine engine of the preceding clause, a maximum arc angle of each of the one or more deflector arms being define as $360/(1.5 \text{ to } 2 \times N)$, where N is the number of fastening mechanisms on a respective deflector arm of the one or more deflector arms.

The turbine engine of any preceding clause, the one or more fastening mechanisms being disposed entirely upstream of the dome upstream surface.

The turbine engine of any preceding clause, the one or more fastening mechanisms including brazing.

The turbine engine of any preceding clause, the one or more fastening mechanisms including rivets.

The turbine engine of any preceding clause, the one or more fastening mechanisms including bolts.

The turbine engine of any preceding clause, the first dome panel including one or more dome feed cooling holes extending from the dome upstream surface to the dome downstream surface.

The turbine engine of any preceding clause, the first deflector panels including one or more multi-hole cooling holes extending from the deflector upstream surface to the deflector downstream surface.

The turbine engine of any preceding clause, the first deflector panel including one or more partition arms that form a partition between respective segments of the first deflector panel.

The turbine engine of any preceding clause, the one or more partition arms axially extending from the deflector upstream surface of the first deflector panel to the dome upstream surface of the first dome panel.

The turbine engine of any preceding clause, the one or more partition arms including one or more cooling holes.

The turbine engine of any preceding clause, the one or more deflector arms including a first set of deflector arms being circumferentially spaced around a first circumference on the first deflector panel, the first circumference having a first diameter.

The turbine engine of any preceding clause, the one or more deflector arms including a second set of deflector arms being circumferentially spaced around a second circumference on the first deflector panel, the second circumference having a second diameter, the second diameter being greater than the first diameter.

The turbine engine of any preceding clause, the one or more deflector arms including a plurality of deflector arms being spaced circumferentially around the deflector upstream surface of the first deflector panel at an arc angle of thirty degrees.

The turbine engine of any preceding clause, the one or more deflector arms including a plurality of deflector arms being spaced circumferentially around the deflector upstream surface of the first deflector panel at an arc angle of ninety degrees.

The turbine engine of any preceding clause, the first deflector panel including a plurality of segments separated by a plurality of gaps, the plurality of gaps being generally circular.

The turbine engine of any preceding clause, the first deflector panel including a plurality of segments separated by a plurality of gaps, the plurality of gaps being generally rectilinear.

The turbine engine of any preceding clause, the first deflector panel including a plurality of segments separated by a plurality of gaps, the plurality of segments including three segments.

The turbine engine of any preceding clause, the first deflector panel including a plurality of segments separated by a plurality of gaps, the plurality of segments including four segments.

The turbine engine of any preceding clause, the first deflector panel including a plurality of segments separated by a plurality of gaps, the plurality of segments including seven segments.

The turbine engine of any preceding clause, the first deflector panel including a plurality of segments separated by a plurality of gaps, the plurality of gaps being positioned every one hundred and twenty degrees around the first deflector panel.

The turbine engine of any preceding clause, the first deflector panel including a plurality of segments separated by a plurality of gaps, the plurality of gaps being positioned every ninety degrees around each of the first deflector panel.

The turbine engine of any preceding clause, the first deflector panel including a plurality of segments separated by a plurality of gaps, the plurality of gaps extending generally axially through each of the first deflector panel.

The turbine engine of any preceding clause, the first deflector panel each including a plurality of segments separated by a plurality of gaps, the plurality of gaps including a step such that respective segments of the plurality of segments overlap.

The turbine engine of any preceding clause, the first deflector panel including a plurality of segments separated by a plurality of gaps, the plurality of gaps being misaligned such that respective segments of the plurality of segments overlap.

The turbine engine of any preceding clause, the first deflector panel including a plurality of segments separated by a plurality of gaps, the plurality of gaps extending at an axial angle between zero degrees and seventy-five degrees.

The turbine engine of any preceding clause, the first deflector panel further including an axially extending member at a radially outer end. The axially extending member is mounted within a respective groove on the dome downstream surface of the first dome panel, the groove including an angled surface.

The turbine engine of any preceding clause, the axially extending member being mounted within a respective groove on the dome downstream surface of the first dome panel, the axially extending member being sized and shaped to generally correspond to a size and a shape of the groove.

The turbine engine of any preceding clause, the axially extending member extending at an axial angle from the deflector upstream surface, the axial angle being between plus or minus forty-five degrees.

The turbine engine of any preceding clause, axially extending wall being mounted within a respective groove on the dome downstream surface of the first dome panel, a connection between the axially extending wall and the groove being sealed.

Although the foregoing description is directed to the preferred embodiments, other variations and modifications will be apparent to those skilled in the art and may be made without departing from the spirit or the scope of the disclosure. Moreover, features described in connection with one embodiment may be used in conjunction with other embodiments, even if not explicitly stated above.

The invention claimed is:

1. An annular dome assembly for a combustor, the annular dome assembly comprising:
    an annular dome including one or more dome panels defining the annular dome, a first dome panel of the one or more dome panels including:
        a dome upstream surface and a dome downstream surface opposite the dome upstream surface;
        an opening for receiving a mixer assembly;
        one or more dome arms extending from the dome upstream surface; and
        one or more apertures extending through the first dome panel from the dome upstream surface to the dome downstream surface, wherein the one or more dome arms define the one or more apertures; and
    a deflector assembly including one or more deflector panels defining the deflector assembly, a first deflector panel of the one or more deflector panels including:
        a deflector upstream surface and a deflector downstream surface opposite the deflector upstream surface; and
        one or more deflector arms that are plate-like and extend from the deflector upstream surface, each of the one or more deflector arms mounted within a respective aperture of the first dome panel and extending upstream of the dome upstream surface.

2. The annular dome assembly of claim 1, wherein the one or more dome arms and the one or more deflector arms are secured together by one or more fastening mechanisms.

3. The annular dome assembly of claim 1, wherein the one or more deflector arms are generally C-shaped.

4. The annular dome assembly of claim 1, wherein the first dome panel includes one or more corner cooling holes for directing a flow of cooling air onto a corner formed between the one or more deflector arms and the deflector upstream surface of the first deflector panel.

5. The annular dome assembly of claim 1, wherein a connection of the one or more deflector arms with the deflector upstream surface includes a blended corner.

6. The annular dome assembly of claim 1, wherein the first deflector panel further includes an axially extending member at a radially outer end, the axially extending member being mounted within a respective groove on the dome downstream surface of the first dome panel.

7. The annular dome assembly of claim 6, wherein the axially extending member includes a seal.

8. The annular dome assembly of claim 1, wherein the one or more deflector arms include a plurality of deflector arms, each of the plurality of deflector arms are spaced circumferentially around the deflector upstream surface of the first deflector panel.

9. The annular dome assembly of claim 8, wherein the plurality of deflector arms are circumferentially spaced apart from each other at an arc angle with respect to a center of the first deflector panel, the arc angle being between thirty degrees and ninety degrees.

10. The annular dome assembly of claim 8, wherein the first deflector panel has an outer circumference, and each of the plurality of deflector arms are positioned around a first circumference having a first diameter such that each of the plurality of deflector arms are positioned at the first diameter, the first circumference being positioned radially between the opening and the outer circumference.

11. The annular dome assembly of claim 10, wherein the plurality of deflector arms include a first plurality of deflector arms positioned around the first circumference and a second plurality of deflector arms positioned around a second circumference having a second diameter that is greater than the first diameter such that each of the second plurality of deflector arms are positioned at the second diameter.

12. The annular dome assembly of claim 1, wherein the first deflector panel includes a plurality of segments.

13. The annular dome assembly of claim 12, wherein each of the plurality of segments includes one or more of the one or more deflector arms.

14. The annular dome assembly of claim 12, wherein a flow of cooling air is directed through one or more gaps formed between each of the plurality of segments.

15. The annular dome assembly of claim 12, further including one or more gaps formed between each of the plurality of segments, wherein the one or more gaps are shaped to provide a flow of cooling air to the deflector downstream surface of the first deflector panel.

16. The annular dome assembly of claim 1, wherein the one or more deflector arms extend between a first end and a second end opposite the first end, the first end disposed at the deflector upstream surface, and the second end disposed upstream of the dome upstream surface.

17. A turbine engine comprising:
  a combustion section including an annular dome assembly and a plurality of mixer assemblies, the annular dome assembly comprising:
    an annular dome including one or more dome panels defining the annular dome, a first dome panel of the one or more dome panels including:
      a dome upstream surface and a dome downstream surface opposite the dome upstream surface;
      an opening for receiving a respective mixer assembly of the plurality of mixer assemblies;
      one or more dome arms extending from the dome upstream surface; and
      one or more apertures extending through the first dome panel from the dome upstream surface to the dome downstream surface, wherein the one or more dome arms define the one or more apertures; and
    a deflector assembly including one or more deflector panels defining the deflector assembly, a first deflector panel of the one or more deflector panels including:
      a deflector upstream surface and a deflector downstream surface opposite the deflector upstream surface; and
      one or more deflector arms that are plate-like and extend from the deflector upstream surface, each of the one or more deflector arms mounted within a respective aperture of the first dome panel and extending upstream of the dome up stream surface.

18. The turbine engine of claim 17, wherein the one or more dome arms and the one or more deflector arms are secured together by one or more fastening mechanisms.

19. The turbine engine of claim 17, wherein the one or more deflector arms are generally C-shaped.

20. The turbine engine of claim 17, wherein the one or more deflector arms extend between a first end and a second end opposite the first end, the first end disposed at the deflector upstream surface, and the second end disposed upstream of the dome upstream surface.

* * * * *